(12) United States Patent
Kawabe

(10) Patent No.: US 8,206,547 B2
(45) Date of Patent: Jun. 26, 2012

(54) METHOD OF MANUFACTURING A DISPLAY

(75) Inventor: Shinichi Kawabe, Yokohama (JP)

(73) Assignees: Hitachi Displays, Ltd., Chiba (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 479 days.

(21) Appl. No.: 12/360,161

(22) Filed: Jan. 27, 2009

(65) Prior Publication Data

US 2009/0218034 A1    Sep. 3, 2009

(30) Foreign Application Priority Data

Feb. 29, 2008   (JP) ................. 2008-049403

(51) Int. Cl.
    *B29C 65/00*    (2006.01)
(52) U.S. Cl. ........... 156/286; 156/87; 156/291; 349/122
(58) Field of Classification Search .......... 156/87, 156/285, 286, 291, 295, 99, 104, 292; 345/173; 349/122, 137

See application file for complete search history.

(56) References Cited

U.S. PATENT DOCUMENTS

| | | | | |
|---|---|---|---|---|
| 5,592,288 | A * | 1/1997 | Sampica et al. | 356/62 |
| 5,956,108 | A * | 9/1999 | Izumi et al. | 349/73 |
| 7,063,758 | B2 * | 6/2006 | Sakayori et al. | 156/87 |
| 7,435,311 | B1 * | 10/2008 | Marzen et al. | 156/286 |
| 2004/0089417 | A1 * | 5/2004 | Bar-Erez et al. | 156/295 |
| 2005/0212776 | A1 * | 9/2005 | Nakajima | 345/173 |
| 2007/0002211 | A1 | 1/2007 | Sasaki et al. | |

FOREIGN PATENT DOCUMENTS

| | | |
|---|---|---|
| JP | 05-011239 | 1/1993 |
| JP | 07-209635 | 8/1995 |
| JP | 07-290647 | 11/1995 |
| JP | 2001-031451 | 2/2001 |
| JP | 2005-089195 | 4/2005 |
| JP | 2005-187231 | 7/2005 |
| JP | 2007-041534 | 2/2007 |

* cited by examiner

*Primary Examiner* — John Goff

(74) *Attorney, Agent, or Firm* — Antonelli, Terry, Stout & Kraus, LLP.

(57) ABSTRACT

In a method of manufacturing a display having a display panel, a transparent protective plate, which is placed in front of the display panel, and a layer formed of a transparent organic medium, which is placed between the display panel and the protective plate, a liquid organic medium is applied to, or a sheet-like organic medium is formed on, a surface of one of the display panel and the protective plate, the display panel and the protective plate are bonded together in a reduced pressure atmosphere, and thereafter the liquid organic medium is cured.

6 Claims, 18 Drawing Sheets

F-F SECTION

FIG.18
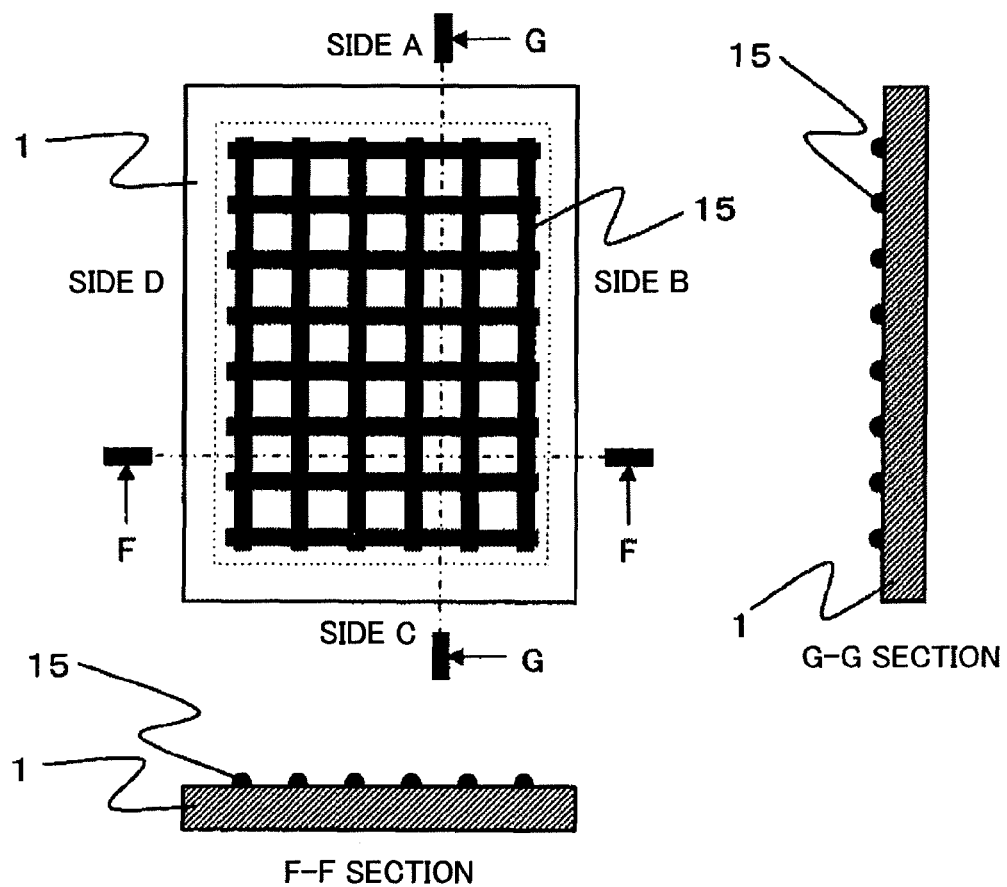
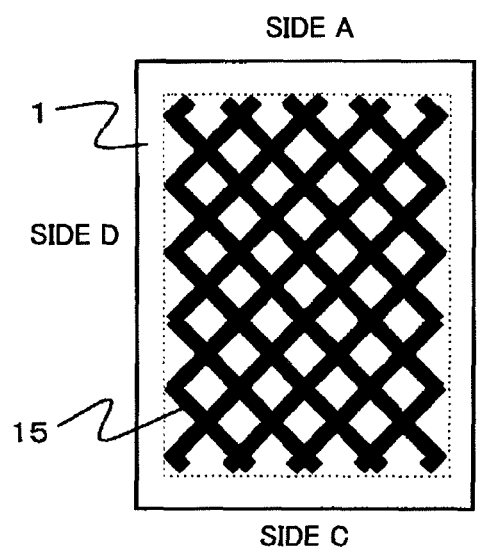
FIG.19A
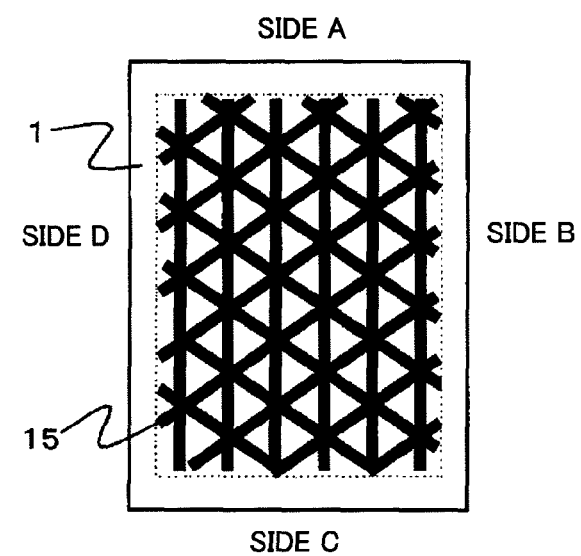
FIG.19B

F-F SECTION

F-F SECTION

F-F SECTION

METHOD OF MANUFACTURING A DISPLAY

CROSS-REFERENCE TO RELATED APPLICATION

The present application claims priority from Japanese application JP2008-049403 filed on Feb. 29, 2008, the content of which is hereby incorporated by reference into this application.

BACKGROUND OF THE INVENTION

1. Field of the Invention

The present invention relates to a method of manufacturing a display that has a transparent protective plate on a surface of a display panel, and more particularly, to a display manufacturing method in which a transparent organic medium layer is formed between the protective plate and the display panel.

2. Description of the Related Art

Many of displays for home-use televisions and personal computers and information displays installed in public facilities are liquid crystal displays or organic electroluminescence displays. Liquid crystal displays are employed in a particularly wide range of products from as small ones as 2-inch monitors for cellular phones and the like to 60-inch or larger television monitors.

Most liquid crystal displays have two 0.2 to 0.7 mm-thick glass plates between which a liquid crystal is held. Some cellular phones, digital cameras, small-sized information terminals, and other devices where the liquid crystal panel surface is frequently touched during use therefore have a transparent protective plate in front of the liquid crystal panel to prevent external mechanical forces from disturbing displayed data or breaking the liquid crystal panel.

In personal computer monitors, home-use televisions, and other similar appliances, too, where the liquid crystal panel surface is touched less frequently, the liquid crystal panel itself could be shattered if something like tableware or a toy hits the liquid crystal panel surface with a large enough force.

Similarly to cellular phones, digital cameras, small-sized information terminals, and the like, some of such products as personal computer monitors and home-use televisions have a transparent protective plate 2 in front of a liquid crystal panel 1 as illustrated in FIG. 2 in order to prevent damage to the liquid crystal panel.

However, putting a transparent protective plate in front of a liquid crystal panel causes reflection of light at the interface between materials having different optical characteristics, specifically, refractive indices. In the case of the structure illustrated in FIG. 2, light is reflected at the interface between the protective plate 2 and the air existing in front of the protective plate 2, the interface between the protective plate 2 and an air layer 8 located behind the protective plate 2, and the interface between a first polarization plate 4 and the air layer 8. At these interfaces, it is observed that the difference in refractive index between materials causes the reflection of light, which significantly impairs the visibility of a displayed image especially in a bright environment.

In order to avoid this reflection of light due to a difference in refractive index, JP 05-11239 A and JP 2007-41534 A propose a panel structure in which a transparent interlayer 3 is formed instead of the air layer 8 between the protective plate 2 and the polarization plate 4 from an organic medium whose refractive index is the same as, or close to, that of the protective plate 2 and the polarization plate 4, thereby reducing reflection of external light and improving the visibility of a displayed image. (See FIGS. 3 and 4.)

The transparent interlayer 3 placed between the polarization plate 4, which is attached to a surface of the display panel 1, and the protective plate 2 is liquid or solid at room temperature in JP 05-11239 A and JP 2007-41534 A.

In the case where the transparent interlayer 3 is a liquid resin layer, the liquid transparent interlayer 3 whose refractive index is the same as, or close to, that of the polarization plate 4 and the protective plate 2 is sealed with a sealant 9 between the polarization plate 4, which is attached to the surface of the display panel 1, and the protective plate 2 as illustrated in FIG. 4.

In the case where the transparent interlayer 3 is solid, thermally curable resin or photo-curable resin is employed as a liquid organic medium, the liquid thermally curable, or photo-curable, resin is sealed with the sealant 9 between the polarization plate 4, which is attached to the surface of the display panel 1, and the protective plate 2 as described above, and then the resin is cured by heat or irradiation of light. Alternatively, a resin having the above-mentioned characteristics is shaped into a sheet having a desired thickness, and cured to obtain a sheet-shaped organic medium. The sheet-shaped organic medium is boned between the polarization plate 4, which is attached to the surface of the display panel 1, and the protective plate 2. A desired liquid crystal display 10 is thus manufactured.

Many laminated glass manufacturing methods similar to the ones described above have been proposed. A few of the proposed method of manufacturing laminated glass are introduced below.

1) Laminated Glass Manufacturing Method: Vacuum Bonding

The laminated glass manufacturing method that is employed most is the following vacuum bonding. This is a method of manufacturing laminated glass by, as described in the paragraph 0003 of JP 2005-187237 A, sandwiching an interlayer for laminated glass between at least two glass plates and deaerating the assembly with the use of a nip roll (pressure roll) (squeezing deaeration), or putting the assembly in a rubber bag to be suctioned under reduced pressure for preliminary press-fit, in which the air remaining between the glass plates and the interlayer for laminated glass is deaerated, and then heating and pressurizing the assembly in an autoclave for main press-fit.

The most common interlayer employed for such uses is polyvinyl butyral (PVB) plasticized by a plasticizer, because of its combined characteristics such as excellent adhesion with glass plates and synthetic resin plates, high tensile strength, and high transparency.

An interlayer used in this method sometimes has an embossed (concavo-convex) pattern on its surface in order that the spaces between the interlayer and the glass plates sandwiching the interlayer are deaerated better during bonding. In this case, the polymerization degree of a resin is lowered or the plasticizer content is increased in order to erase the embossed pattern more completely.

A problem of using a thermoplastic resin interlayer made of the PVB resin in this manufacturing method is that the interlayer needs to be bonded at high temperature and high pressure in an autoclave after temporary thermal bonding, which is laborious. Other problems include costly plant and equipment investment due to the installation of an autoclave, and poor production efficiency since the main press-fit using an autoclave is a batch process.

2) Laminated Glass Manufacturing Method: Atmospheric Bonding

JP 2001-31451 A and JP 2005-187237 A, for example, disclose methods capable of laminating glass at room temperature without needing temporary thermal bonding and a high-temperature, high-pressure process that uses an autoclave. These methods accomplish improved adhesion between the glass plates and the interlayer without temporary thermal bonding and a high-temperature, high-pressure process that uses an autoclave, by adjusting the physical properties and the like of the interlayer bonded between two glass plates in order to eliminate the necessity of performing temporary thermal bonding and a high-temperature, high-pressure process that uses an autoclave.

A manufacturing process using this interlayer is as follows:

First, a mold releasing film is peeled from one side of the interlayer, and one of two glass plates or synthetic resin plates is inserted between a nip roll and a rubber drive roll in such a manner that the interlayer is brought into contact with the glass (or synthetic resin) plate for the first time between the rolls, thereby sticking the interlayer to a surface of the glass (or synthetic resin) plate.

Next, the remaining mold releasing film is peeled, the glass (or synthetic resin) plate to which the interlayer has been stuck is placed to face the other glass (or synthetic resin) plate without contacting the other plate via the interlayer, and the ends of the two plates are nipped between the nip roll and the rubber drive roll in such a manner that the two plates are brought into contact with each other for the first time between the rolls, thereby bonding the two plates together in a continuous manner.

3) Laminated Glass Manufacturing Method: Liquid Resin Injection

As a different type of laminated glass manufacturing method that does not need temporary thermal bonding and a high-temperature, high-pressure process that uses an autoclave, JP 2005-89195 A and JP 07-290647 A disclose a method in which a liquid resin is injected into a space between glass plates and then cured at room temperature.

In this laminated glass manufacturing method, laminated glass having a space for injecting a liquid interlayer between two glass substrates is manufactured first, then a liquid interlayer resin is injected into the space between the two glass substrates, and the inlet is sealed after the injection is completed. Laminated glass having a liquid interlayer is obtained by this manufacturing method.

When a thermally curable resin or a photo-curable resin is employed for the liquid interlayer, laminated glass having a solid interlayer can be manufactured by heating the interlayer or irradiating the interlayer with light after injecting the liquid interlayer resin in the space between the two glass substrates and sealing the inlet.

JP 07-209635 A discloses a manufacturing method of a structure for preventing scattering of light in a liquid crystal display. This document's method using close bonding in a reduced-pressure atmosphere includes a first close bonding step in which a shock absorbing layer is closely bonded to a protective panel and a second close bonding step in which a liquid crystal cell is added to this assembly by close bonding. In the first close bonding step, the protective panel is placed on a substrate, and a liquid raw material capable of preventing scattering of light is poured from above the protective panel and cured. Alternatively, in the first close bonding step, a light scattering preventing material that is already cured and in a solid state is wound into a roll and put at an end of the protective panel, which is placed on a substrate. The roll is gradually unwound so that the solid light scattering preventing material is stuck to the protective panel while expelling air from under the roll. In the second close bonding step, the protective panel to which the shock absorbing layer has been closely bonded in the first close bonding step is put in a pressure reduction chamber. The protective panel is gradually lowered to be closely bonded to the liquid cell, while a suction pump connected to the pressure reduction chamber is driven to put the interior of the pressure reduction chamber in a reduced pressure atmosphere. This step does not necessarily need to be performed in a pressure reduction chamber if there is no trouble in expelling air from between the protective panel and the liquid crystal cell.

As mentioned above, several laminated glass manufacturing methods have been proposed as a way to bond a transparent interlayer between two hard display panels or between a hard display panel and a protective plate. However, the method of bonding a sheet-shaped transparent interlayer in vacuum has a problem in that the need to use an autoclave for a high-temperature, high-pressure process in order to obtain sufficient adhesion without trapping air bubbles makes the work laborious. Other problems of this method include costly plant and equipment investment due to the installation of an autoclave and poor production efficiency since the main press-fit using an autoclave is a batch process.

Although methods capable of laminating glass at room temperature without needing temporary thermal bonding and a high-temperature, high-pressure process that uses an autoclave have been published in order to solve the above-mentioned problems of vacuum bonding, these methods do not require temporary thermal bonding and a high-temperature, high-pressure process that uses an autoclave by adjusting the physical properties and the like of the interlayer bonded between two glass plates, and are therefore limited in terms of materials that can be employed in order to eliminate the necessity of performing temporary thermal bonding and a high-temperature, high-pressure process that uses an autoclave.

Other types of method have been proposed including one in which laminated glass having a space for injecting a liquid interlayer between two glass substrates is manufactured first, then a liquid interlayer resin is injected into the space between two glass substrates, the inlet is sealed after the injection is completed, and the interlayer is cured if necessary. This method, however, involves an injection length of the interlayer resin and has a fear of trapping air bubbles.

SUMMARY OF THE INVENTION

The present invention relates to a method of bonding a transparent interlayer whose refractive index is the same as, or close to, that of the above-mentioned display panel and the protective plate for protecting the display panel between the display panel and the protective plate without trapping air bubbles or the like.

An object of the present invention is to provide a display manufacturing method that is less limited in terms of employable materials, that can keep the equipment cost necessary for the manufacture low, and that is capable of forming a transparent interlayer between a display panel and a protective plate in a short time without trapping air bubbles.

To solve the above-mentioned problems and attain the above-mentioned object, the present invention employs the following measures:

[Measure 1] In a display having a display panel, a transparent protective plate, which is placed in front of the display panel, and a transparent organic medium layer, which is placed between the display panel and the protective plate, a liquid organic medium is applied vertically and horizontally in a grid pattern one of to a surface of the display panel, to a surface of the protective plate, and to both surfaces of the display panel and the protective plate, the display panel and the protective plate are bonded together in a reduced pressure atmosphere after the organic medium is applied, and then the organic medium is cured.

[Measure 2] In a display having a display panel, a transparent protective plate, which is placed in front of the display panel, and a transparent organic medium layer, which is placed between the display panel and the protective plate, a liquid organic medium is applied to a surface of the display panel in a stripe pattern, the liquid organic medium is applied to a surface of the protective plate in a stripe pattern that intersects the stripe pattern of the organic medium applied to the surface of the display panel, the display panel and the protective plate are bonded together in a reduced pressure atmosphere after the organic medium is applied, and then the organic medium is cured.

[Measure 3] In a display having a display panel, a transparent protective plate, which is placed in front of the display panel, and a transparent organic medium layer, which is placed between the display panel and the protective plate, a liquid organic medium is applied evenly to a surface of one of the display panel and the protective plate to a substantially constant thickness without leaving a single spot uncoated, the liquid organic medium is applied vertically and horizontally in a grid pattern to a surface that faces the evenly coated surface, the display panel and the protective plate are bonded together in a reduced pressure atmosphere after the organic medium is applied, and then the organic medium is cured.

[Measure 4] In a display having a display panel, a transparent protective plate, which is placed in front of the display panel, and a transparent organic medium layer, which is placed between the display panel and the protective plate, a liquid organic medium is applied evenly one of to a surface of the display panel, to a surface of the protective plate, and to both surfaces of the display panel and the protective plate, to a substantially constant thickness without leaving a single spot uncoated, then the organic medium is cured, and the display panel and the protective plate are bonded together in a reduced pressure atmosphere after the organic medium is cured.

[Measure 5] In a display having a display panel, a transparent protective plate, which is placed in front of the display panel, and a transparent organic medium layer, which is placed between the display panel and the protective plate, a transparent organic medium sheet shaped in advance into a sheet of a desired thickness is bonded to a surface of one of the display panel and the protective plate, a liquid organic medium is applied vertically and horizontally in a grid pattern to a surface that faces the surface bonded to the transparent organic medium sheet, the display panel and the protective plate are bonded together in a reduced pressure atmosphere after the organic medium is applied, and then the organic medium is cured.

[Measure 6] In a display having a display panel, a transparent protective plate, which is placed in front of the display panel, and a transparent organic medium layer, which is placed between the display panel and the protective plate, a liquid organic medium is applied evenly to a surface of one of the display panel and the protective plate to a substantially constant thickness without leaving a single spot uncoated, and then the applied organic medium is cured. The liquid organic medium is applied vertically and horizontally in a grid pattern to a surface that faces the evenly coated surface, the display panel and the protective plate are bonded together in a reduced pressure atmosphere after the organic medium is applied, and thereafter the organic medium is cured.

[Measure 7] In a display having a display panel, a transparent protective plate, which is placed in front of the display panel, and a transparent organic medium layer, which is placed between the display panel and the protective plate, a liquid organic medium is applied in a frame pattern to a surface of one of the display panel and the protective plate in an area that is outside an effective display portion of the display panel and that is to surround the effective display portion of the display panel after the display panel and the protective plate are bonded together, then the organic medium is cured, the liquid organic medium is applied vertically and horizontally in a grid pattern to a surface of another one of the display panel and the protective plate, the display panel and the protective plate are bonded together in a reduced pressure atmosphere after the organic medium is applied, and thereafter the organic medium is cured.

[Means 8] In a display having a display panel, a transparent protective plate, which is placed in front of the display panel, and a transparent organic medium layer, which is placed between the display panel and the protective plate, transparent organic medium sheets shaped in advance into slip sheets of a desired thickness are arranged in a frame pattern and bonded to a surface of one of the display panel and the protective plate in an area that is outside an effective display portion of the display panel and that is to surround the effective display portion of the display panel after the display panel and the protective plate are bonded together, a liquid organic medium is applied vertically and horizontally in a grid pattern to a surface of another one of the display panel and the protective plate, the display panel and the protective plate are bonded together in a reduced pressure atmosphere after the organic medium is applied, and thereafter the organic medium is cured.

A manufacturing method according to the present invention is less limited in terms of the physical properties of materials that can be used as a transparent interlayer, and can keep the equipment cost necessary for the manufacture low. Further, a transparent interlayer can be formed in a short time without trapping air bubbles between a display panel and a protective plate.

BRIEF DESCRIPTION OF THE DRAWINGS

In the accompanying drawings:

FIG. 18 is a plan view/sectional view illustrating a grid-like application pattern;

FIGS. 19A and 19B are plan views illustrating grid-like application patterns;

DETAILED DESCRIPTION OF THE INVENTION

A specific description of the present invention is given through embodiments.

[Liquid Organic Medium Application Patterns]

Application patterns of a liquid organic medium are described with reference to the drawings.

Figure 3:
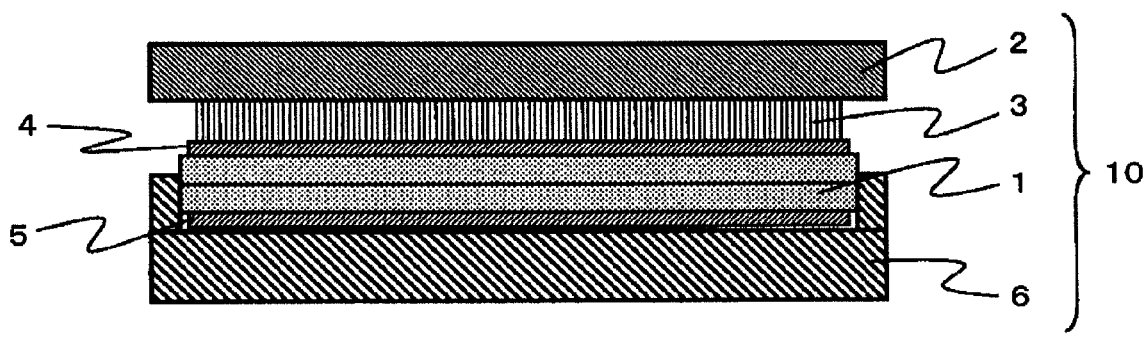
FIG. 3 is a sectional view of a liquid crystal display according to an embodiment of the present invention.
Figure 4:
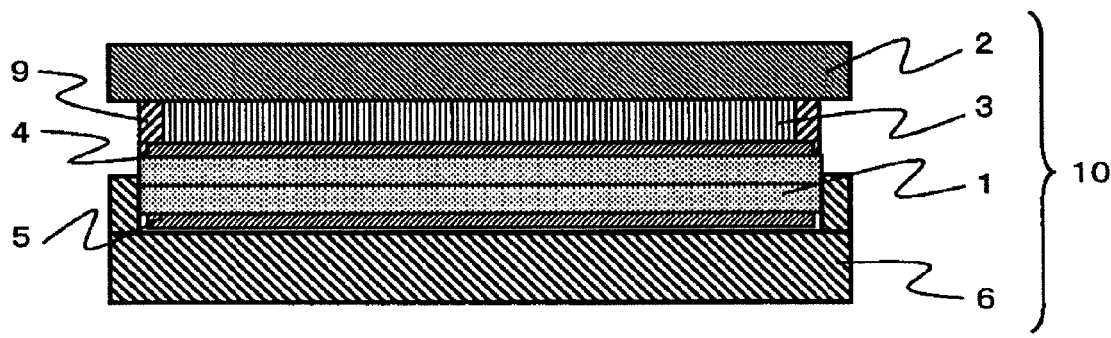
FIG. 4 is another sectional view of the liquid crystal display according to the embodiment of the present invention.
Figure 5:
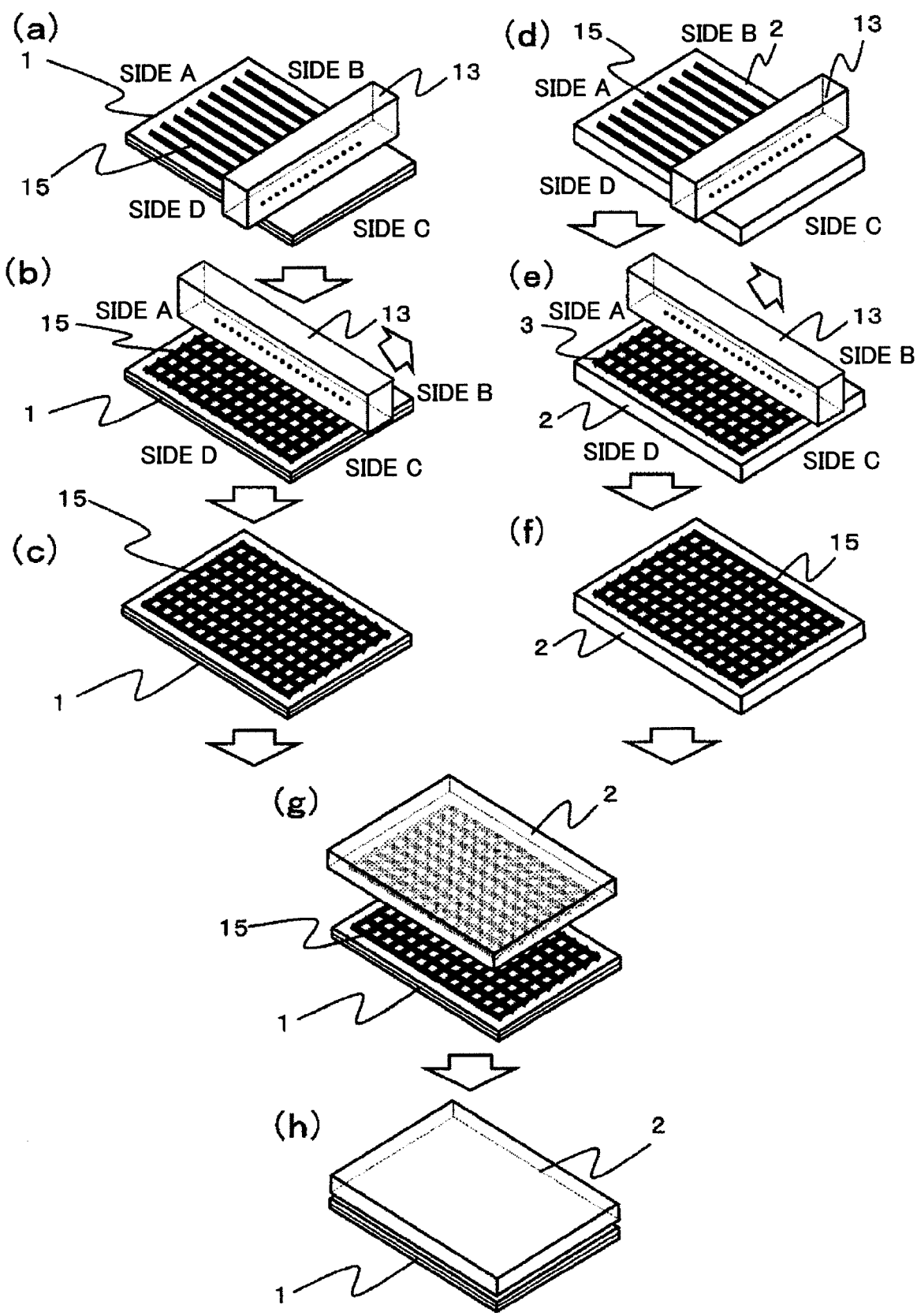
FIGS. 5A to 5H are perspective views illustrating the first embodiment of the present invention.

The total amount of a liquid organic medium applied to the display panel or the protective plate ultimately equals the thickness of the transparent interlayer 3 of the liquid crystal display 10 according to embodiments of the present invention which are illustrated in FIGS. 3 and 4. In order to form a transparent interlayer between the display panel 1 and the protective plate 2 without trapping air bubbles, how a liquid transparent interlayer is applied described below is an important point.

Figure 15:
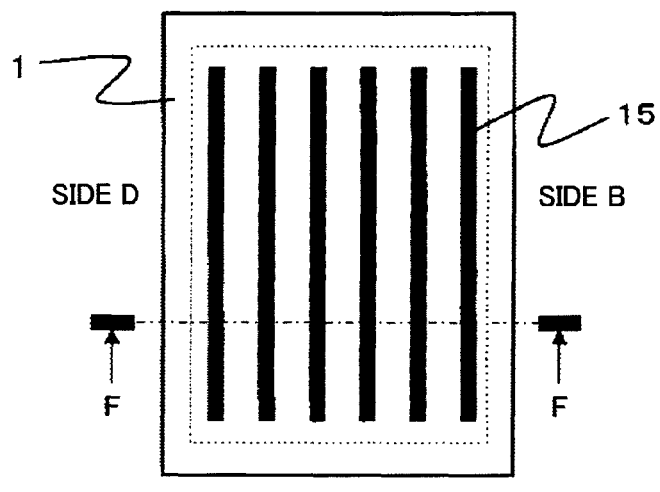
FIG. 15 is a plan view/sectional view illustrating a stripe application pattern.
Figure 15:
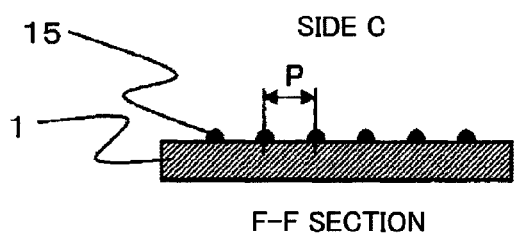
Figure 16:
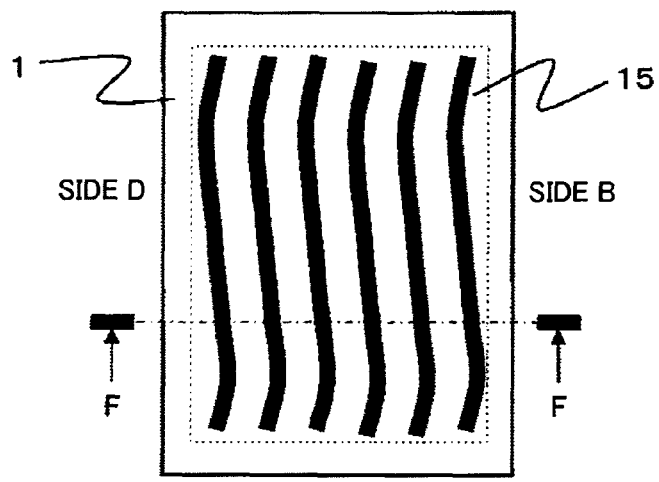
FIG. 16 is a plan view/sectional view illustrating a stripe application pattern.
Figure 16:
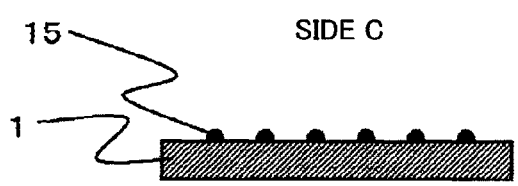
Figure 17:
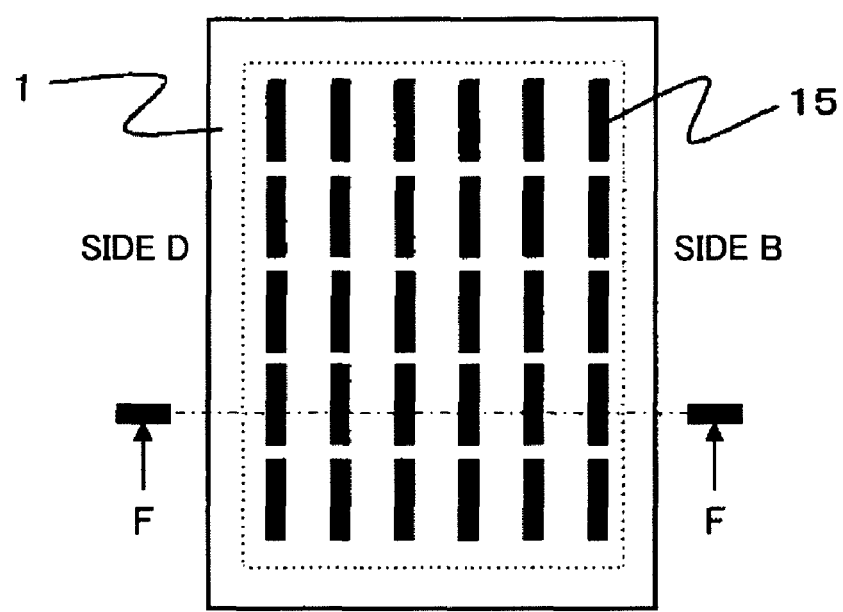
FIG. 17 is a plan view/sectional view illustrating a stripe application pattern.
Figure 17:
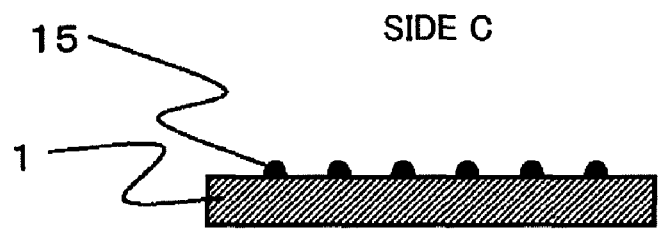

For better understanding of the following embodiments, the names of liquid organic medium application patterns used in the embodiments are defined as follows:

Stripe Application Pattern: a pattern in which a liquid organic medium is applied to the top face of the display panel 1 or the protective plate 2, which is an application target, in multiple linear lines running between Side A and Side C as illustrated in FIG. 15. A portion where a liquid organic medium 15 is applied and a portion where the liquid organic medium 15 is not applied appear alternately, thereby forming a stripe pattern. An interval P (application pitch) between adjacent lines of the multiple applied lines of the liquid organic medium 15 may be constant or varied within one substrate. While the liquid organic medium 15 illustrated in FIG. 15 is applied in linear lines, the same result is obtained when the liquid organic medium 15 is applied in curved lines as illustrated in FIG. 16. Also, while the liquid organic medium 15 illustrated in FIG. 15 is applied in straight lines running continuously between Side A and Side C, the same result is obtained when the liquid organic medium 15 is applied in broken linear lines having uncoated portions in places as illustrated in FIG. 17. Therefore, all these patterns are collectively referred to as stripe application patterns.

Grid-like Application Pattern: A pattern drawn by applying the liquid organic medium 15 is vertically and horizontally like a grid as illustrated in FIG. 18. Basically, a pattern formed from a stripe pattern that has multiple linear application lines running between Side A and Side C and a stripe pattern that has multiple linear application lines running between Side B and Side D so as to intersect the lines running between Side A and Side C is called a grid-like pattern. While FIG. 18 illustrates an application pattern of a grid that linearly connects Side B and Side D crosswise and that linearly connects Side A and Side C lengthwise, the same result is obtained with an oblique application pattern illustrated in FIG. 19A and a pattern illustrated in FIG. 19B where three different stripe patterns intersect one another. Therefore, all these patterns are collectively referred to as grid-like patterns. Also, as is the case of the stripe application pattern, the result obtained when application lines connecting Side B with Side D and Side A with Side C are linear and the result obtained when application lines connecting Side B with Side D and Side A with Side C are curved are the same. The same result is obtained also when grid lines of the applied liquid organic medium 15 are broken by uncoated spots. Therefore, all these patterns are collectively referred to as grid-like application patterns.

Figure 20:
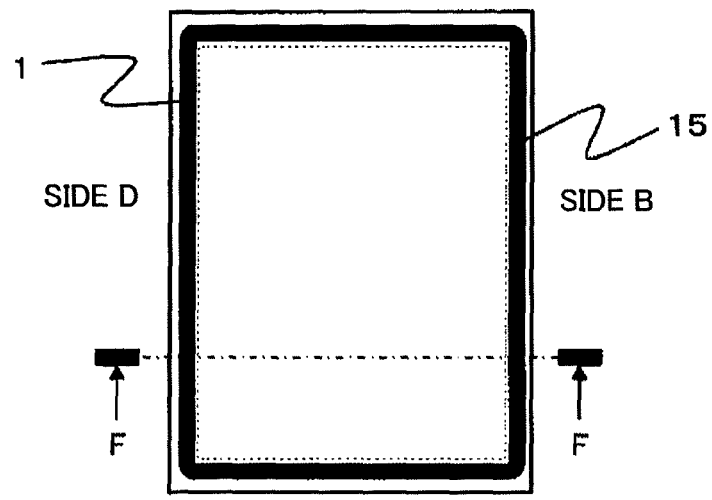
FIG. 20 is a plan view/sectional view illustrating a frame-like application pattern.
Figure 20:
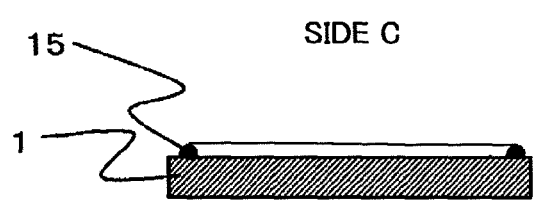
Figure 21A:
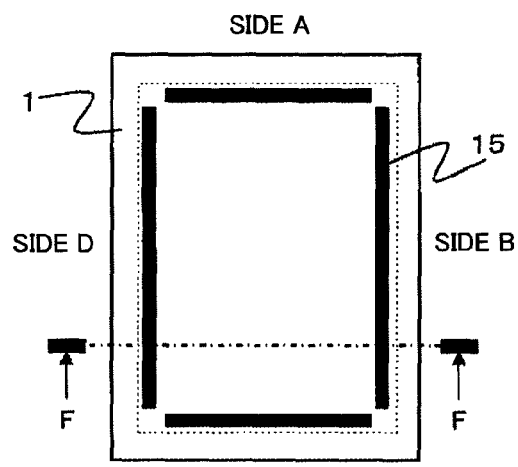
FIGS. 21A and 21B are plan views/sectional views illustrating frame-like application patterns.
Figure 21A:
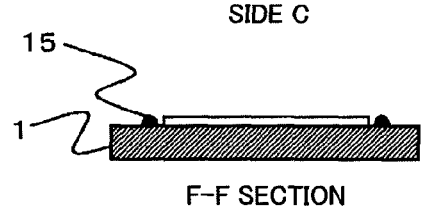
Figure 21B:
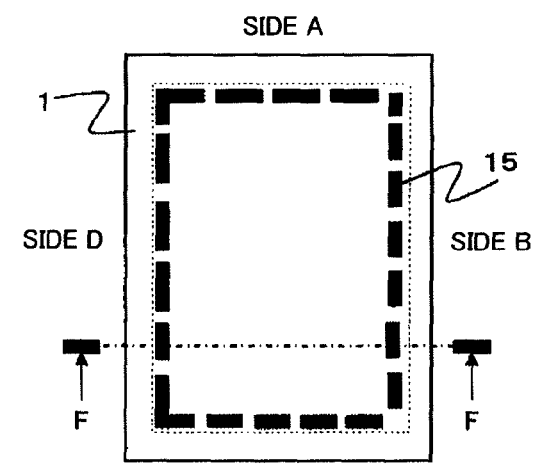
Figure 21B:
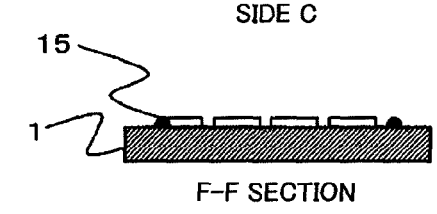

Frame-like Application Pattern: a pattern obtained by applying the liquid organic medium 15 to the top face of the display panel 1 or the protective plate 2, which is an application target, in a frame shape (quadrangle) as illustrated in FIG. 20. An application pattern placed outside of the effective display area to surround the effective display area and an application pattern placed inside the effective display area are both called as a frame-like application pattern. While the organic liquid medium 15 illustrated in FIG. 20 is applied in a quadrangle pattern without uncoated spots and forms a closed space, the same result is obtained in the subsequent process with a pattern illustrated in FIG. 21A where the liquid organic medium 15 is not applied in corners and therefore does not form a closed space as well as with a pattern illustrated in FIG. 21B where straight lines are broken by uncoated spots. Therefore, a pattern having uncoated spots is also called as a frame-like application pattern.

Figure 22:
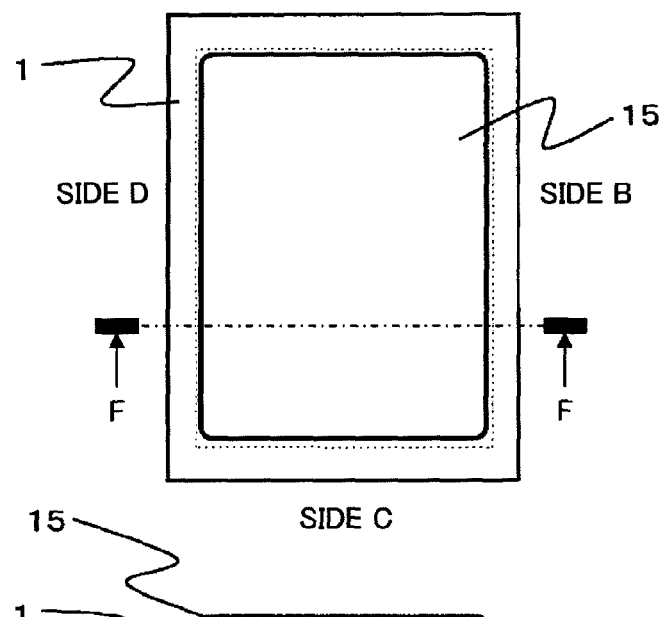
FIG. 22 is a plan view/sectional view illustrating a solid application pattern.

Solid Application: a pattern that leaves no uncoated spot within the liquid organic medium application range of the display panel 1 or the protective plate 2, which is an application target, as illustrated in FIG. 22 is referred to as solid application. However, the same result is obtained in the subsequent process when a few uncoated spots are produced during application. Therefore, a pattern having a few uncoated spots left is called solid application.

[Liquid Organic Medium Application Methods]

Figure 23:
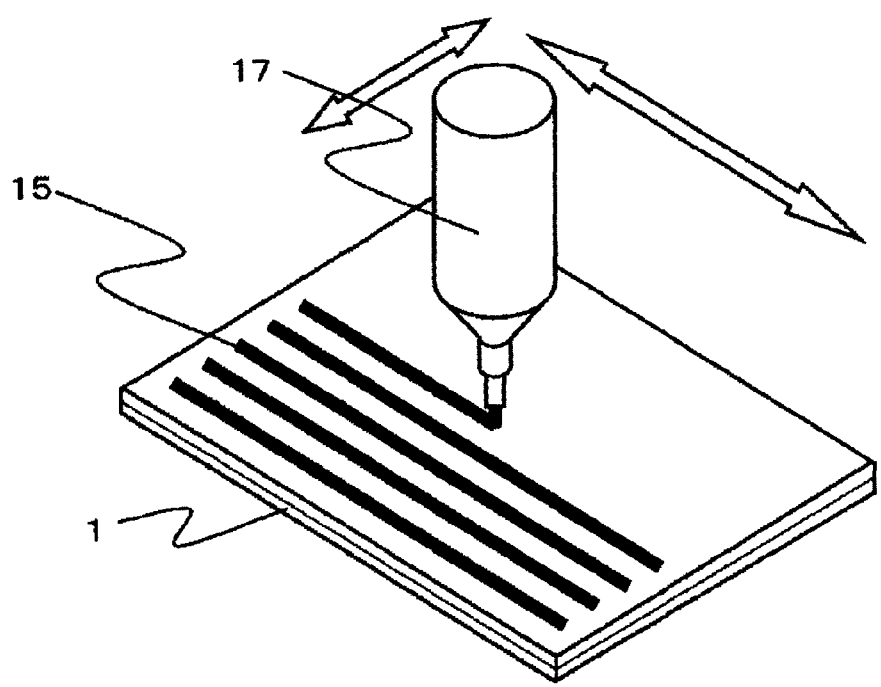
FIG. 23 is a perspective view illustrating an application method that uses a dispenser.

The most common method of forming the stripe application pattern, the grid-like application pattern, and the frame-like application pattern is to apply the liquid organic medium 15 with the use of a pneumatic or mechanical dispenser 17 as the one illustrated in FIG. 23. FIG. 23 illustrates an example in which a single pneumatic or mechanical dispenser 17 is used to form the stripe application pattern. In FIG. 23, an objective application pattern is formed by fixing the display panel or the protective plate to which the liquid organic medium is to be applied and moving the pneumatic or mechanical dispenser over the fixed surface. Alternatively, an objective application pattern may be formed by fixing the pneumatic or mechanical dispenser and moving the display panel or the protective plate to which the liquid organic medium is to be applied. Also, both the pneumatic or mechanical dispenser and the display panel or the protective plate to which the liquid organic medium is to be applied may be moved to form an objective application pattern.

Figure 24:
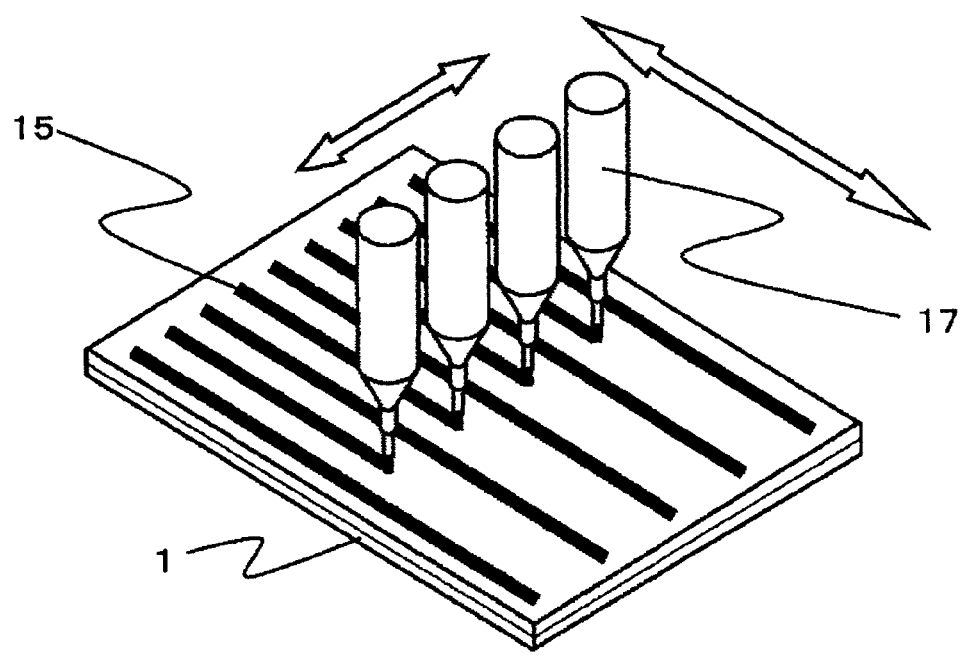
FIG. 24 is a perspective view illustrating an application method that uses a multi-dispenser.
Figure 25:
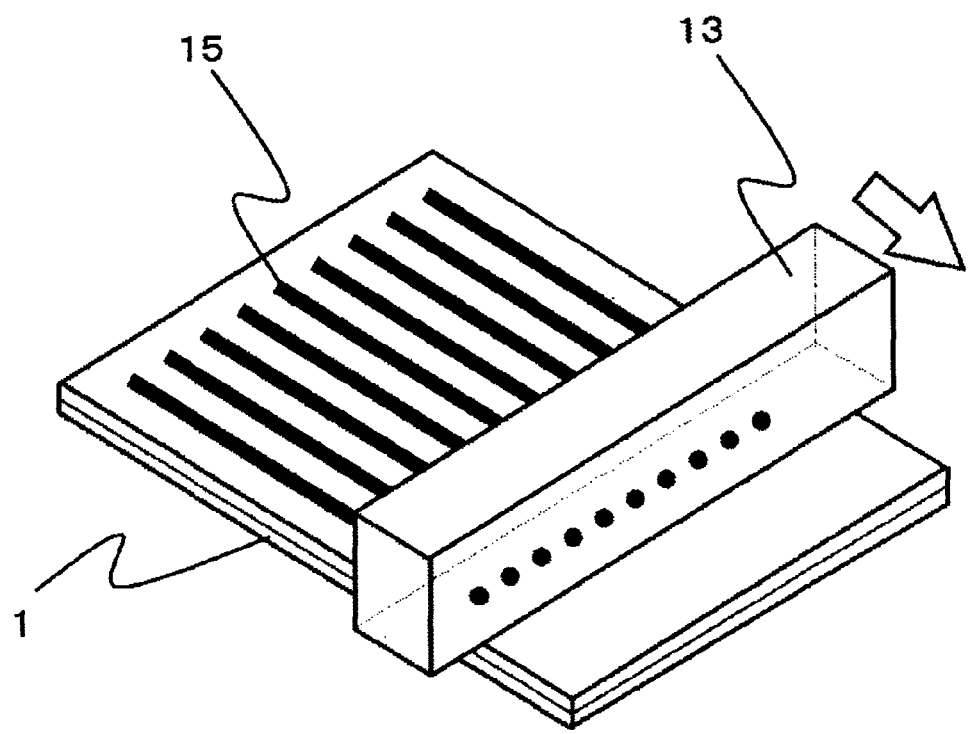
FIG. 25 is a perspective view illustrating an application method that uses a multi-application nozzle.

While FIG. 23 illustrates an example of using a single dispenser 17 to form an objective application pattern, an objective application pattern may be formed with multiple dispensers 17 as illustrated in FIG. 24. A multi-application nozzle 13 having a single drive source for discharging the liquid and multiple outlets (nozzles) through which the liquid organic medium 15 is applied to the display panel or the protective plate, which is an application target, may also be employed as illustrated in FIG. 25. This way, an objective application pattern can be formed in a shorter time than when a single dispenser is used.

Other employable methods of forming the stripe, grid-like, and frame-like application patterns are screen printing and offset printing. The stripe application pattern may be formed also by applying the liquid organic medium solidly to the application target substrate and then running a tooth scraper over the application surface.

Although the solid application pattern can be formed by the above-mentioned methods, the most common way to form the solid application pattern is to use a slit application nozzle. A detailed description on how the solid application pattern is formed with the use of a slit application nozzle is omitted.

Embodiments of the present invention are described below with reference to the drawings.

First Embodiment

Figure 1:
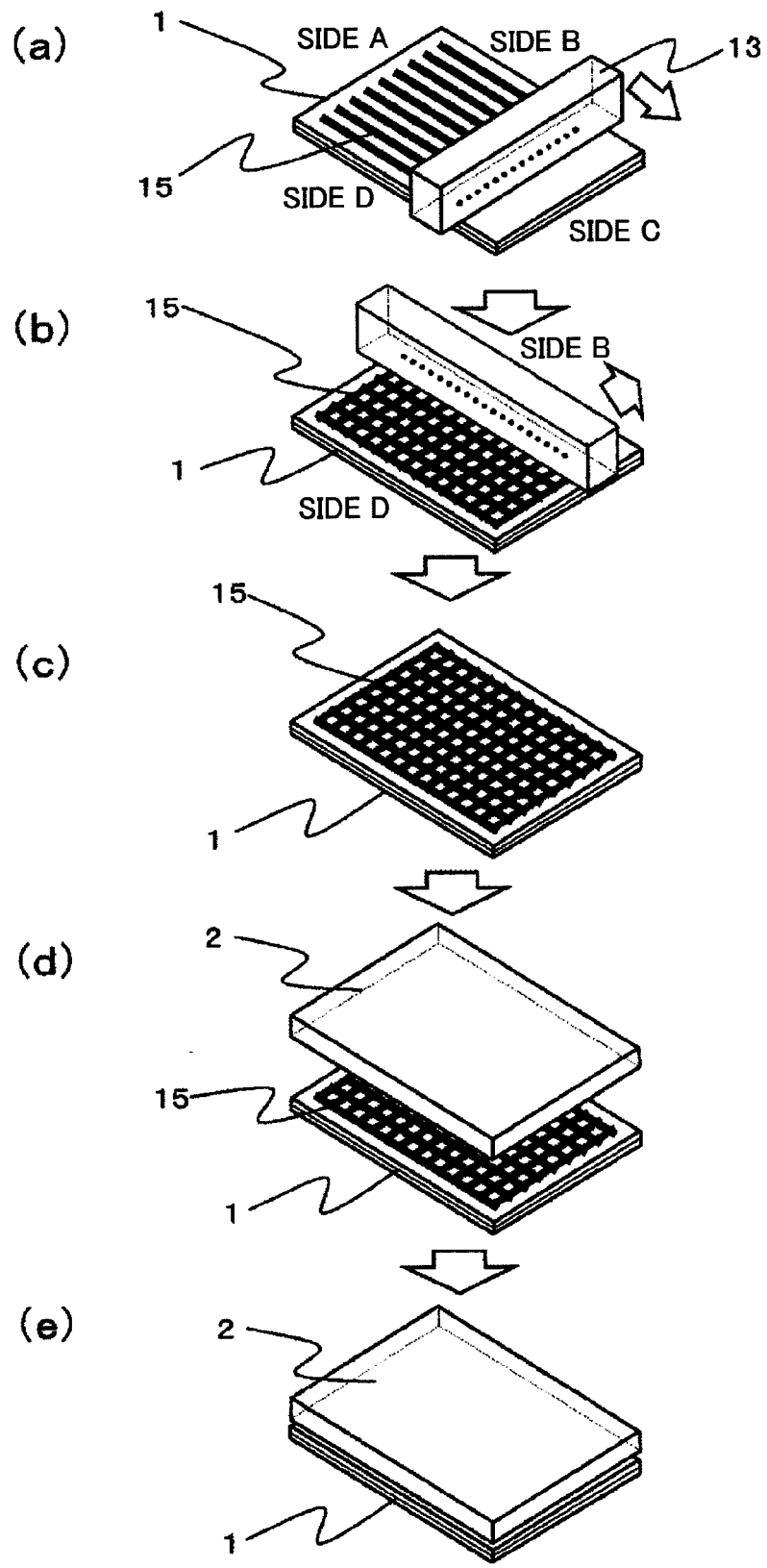
FIGS. 1A to 1E are perspective views illustrating a first embodiment of the present invention.
Figure 2:
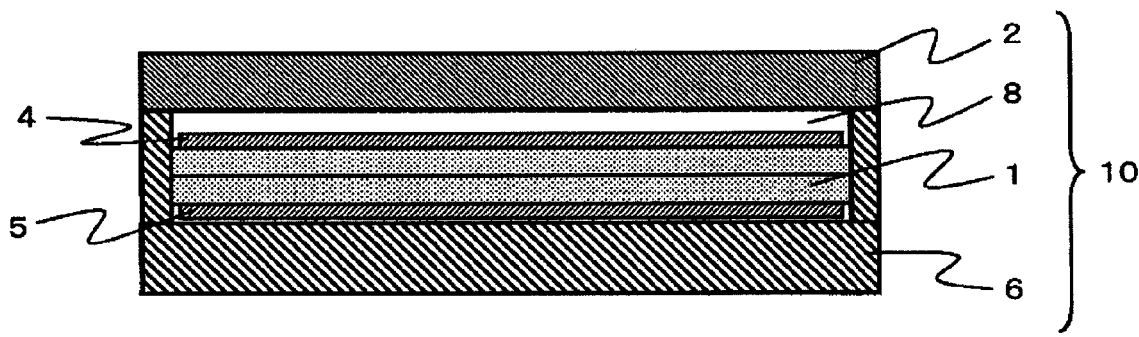
FIG. 2 is a sectional view of a conventional liquid crystal display to which a protective plate is attached.

A first embodiment of the present invention is described with reference to FIGS. 1A to 1E. First, the multi-application nozzle 13 is used to apply the liquid organic medium 15 to a surface of the liquid crystal display panel 1 from Side A to Side C (or from Side C to Side A; either way, the direction does not matter) in a stripe pattern (FIG. 1A). Next, the liquid organic medium 15 is applied to the same surface of the liquid crystal display panel 1 from Side D to Side B (or from Side B to Side D; either way, the direction does not matter) in a stripe pattern that intersects the previously formed stripe application pattern (FIG. 1B). A grid pattern illustrated in FIG. 1C is thus formed. Although FIGS. 1A to 1C illustrate a method of using the multi-application nozzle 13 to form a grid-like application pattern, the grid-like application pattern may be formed by screen printing or offset printing as described in [Liquid Organic Medium Application Methods].

Next, the protective plate 2 is positioned above the liquid crystal display panel 1, where the liquid organic medium 15 has been formed in a grid pattern, and then laid on top of the liquid crystal display panel 1 in a reduced pressure atmosphere (e.g., vacuum chamber) (FIG. 1D). Thereafter, the interior of the vacuum chamber is returned to the atmospheric pressure and a process for curing the liquid organic medium is performed if necessary. How the liquid organic medium is cured varies depending on the composition of the liquid organic medium employed. For example, the liquid organic medium may be cured by irradiation of ultraviolet rays or by heating, or may receive irradiation of ultraviolet rays first to be cured, followed by heating to be cured further.

In the embodiment of FIGS. 1A to 1E, the liquid organic medium 15 is applied to a surface of the liquid crystal display panel 1 in a grid pattern with the use of the multi-application nozzle 13, and then the protective plate 2 to which the liquid organic medium 15 is not applied is laid on top of the liquid crystal display panel 1. The same result is obtained by applying the liquid organic medium 15 in a grid pattern to a surface of the protective plate 2, instead of the liquid crystal display panel 1, and then placing the liquid crystal display panel 1 to which the liquid organic medium 15 is not applied on top of the protective plate 2. Also, the same result is obtained by a method illustrated in FIGS. 5A to 5H, where the liquid organic medium 15 is applied in a grid pattern to surfaces of the liquid crystal display panel 1 and the protective plate 2 both, and then the two are laid on top of each other.

Second Embodiment

Figure 6:
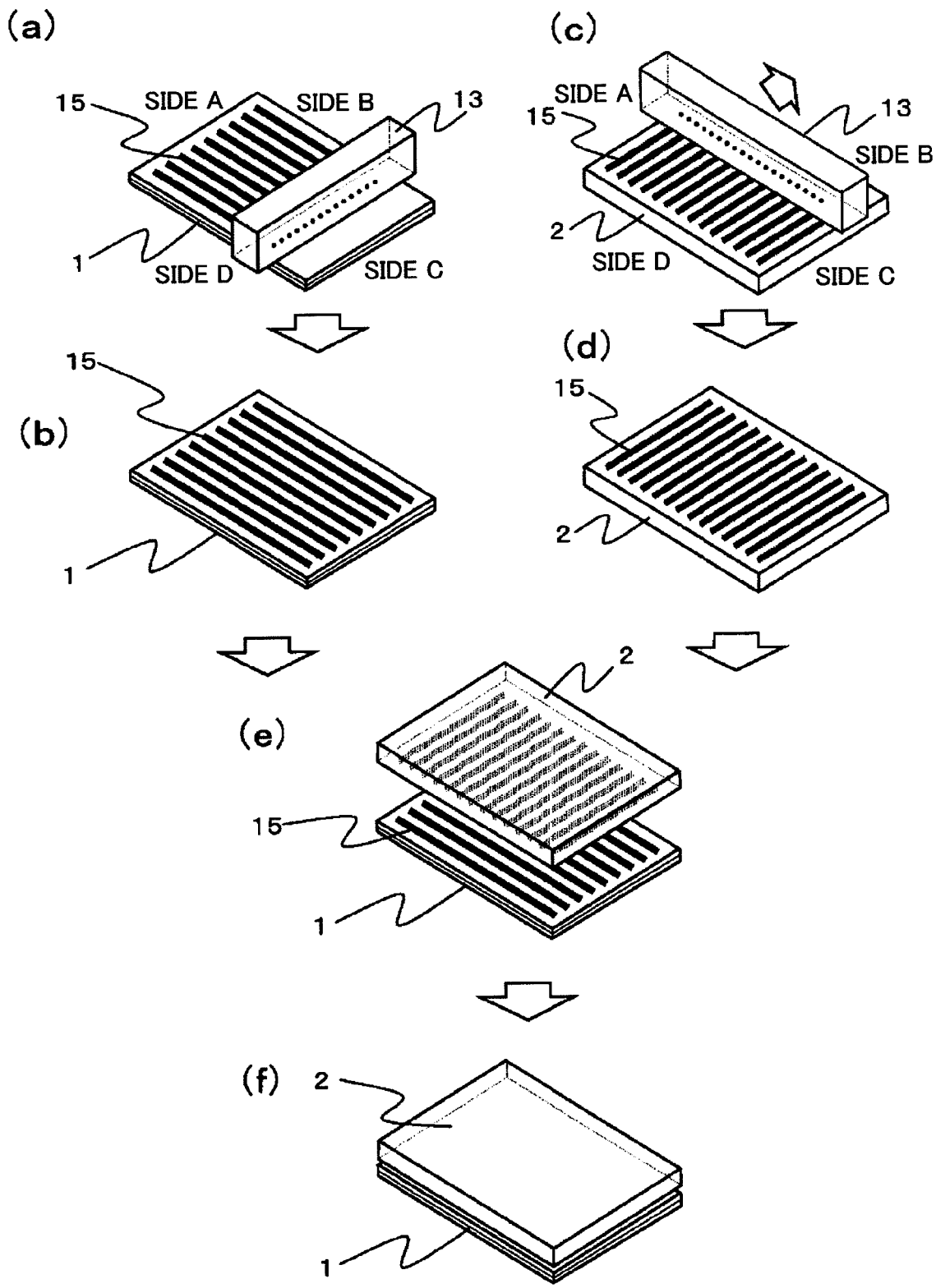
FIGS. 6A to 6F are perspective views illustrating a second embodiment of the present invention.

A second embodiment of the present invention is described with reference to FIGS. 6A to 6F. First, the multi-application nozzle 13 is used to apply the liquid organic medium 15 to a surface of the liquid crystal display panel 1 from Side A to Side C (or from Side C to Side A; either way, the direction does not matter) in a stripe pattern (FIGS. 6A and 6B). Next, the multi-application nozzle 13 is used to apply the liquid organic medium 15 to a surface of the protective plate 2 from Side D to Side B (or from Side B to Side D; either way, the direction does not matter) in a stripe pattern (FIGS. 6C and 6D). Although FIGS. 6A to 6D illustrate a method of using the multi-application nozzle 13 to form a stripe application pattern, the stripe application pattern may be formed by screen printing or offset printing as described in [Liquid Organic Medium Application Methods].

Next, the protective plate 2, where the liquid organic medium 15 has been formed in a stripe pattern, is positioned above the liquid crystal display panel 1, where the liquid organic medium 15 has also been formed in a stripe pattern, and then laid on top of the liquid crystal display panel 1 in a reduced pressure atmosphere (e.g., vacuum chamber) (FIG. 6E). Thereafter, the interior of the vacuum chamber is returned to the atmospheric pressure and a process for curing the liquid organic medium is performed if necessary.

What is important here is that the liquid organic medium 15 is applied in such directions that the stripe pattern on the liquid crystal display panel 1 and the stripe pattern on the protective plate 2 intersect each other when the two substrates are laid on top of each other.

Third Embodiment

Figure 7:
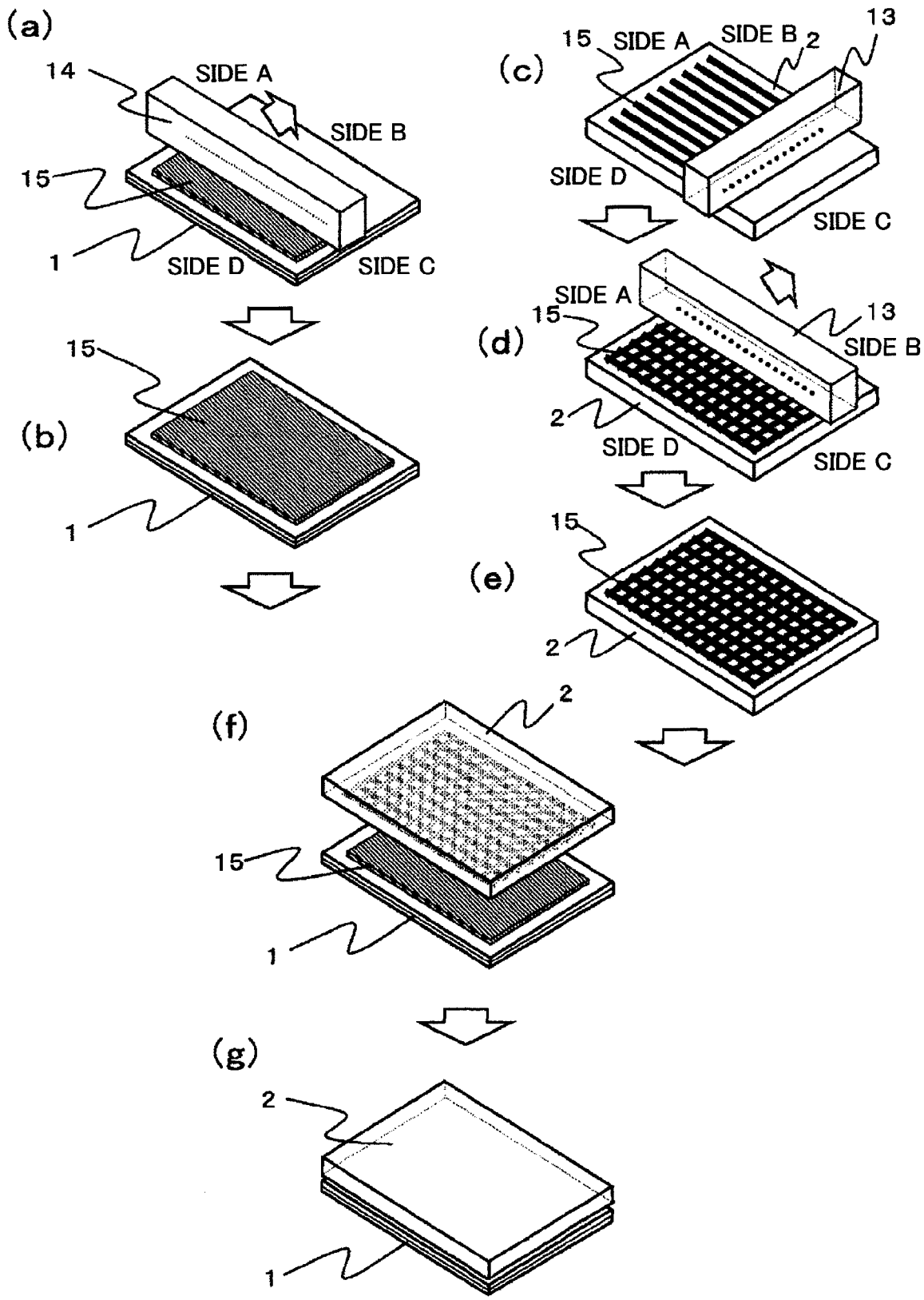
FIGS. 7A to 7G are perspective views illustrating a third embodiment of the present invention.

A third embodiment of the present invention is described with reference to FIG. 7. First, a slit application nozzle 14 is used to apply the liquid organic medium 15 solidly to a surface of the liquid crystal display panel 1 from Side D to Side B (or from Side B to Side D, from Side A to Side C, from Side C to Side A; any way, the direction does not matter) (FIGS. 7A and 7B).

Next, the multi-application nozzle 13 is used to apply the liquid organic medium 15 to a surface of the protective plate 2 from Side A to Side C (or from Side C to Side A; either way, the direction does not matter) in a stripe pattern (FIG. 7C). The liquid organic medium 15 is then applied to the same surface of the protective plate 2 from Side D to Side B (or from Side B to Side D; either way, the direction does not matter) in a stripe pattern that intersects the previously formed stripe application pattern (FIG. 7D). A grid pattern illustrated in FIG. 7E is thus formed.

Thereafter, the protective plate 2, where the liquid organic medium 15 has been formed in a grid pattern, is positioned above the liquid crystal display panel 1, where the liquid organic medium 15 has solidly been formed, and then laid on top of the liquid crystal display panel 1 in a reduced pressure atmosphere (e.g., vacuum chamber) (FIG. 7F). Thereafter, the interior of the vacuum chamber is returned to the atmospheric pressure and a process for curing the liquid organic medium is performed if necessary.

In the embodiment of FIGS. 7A to 7G, the slit application nozzle 14 is used to apply the liquid organic medium 15 solidly to a surface of the liquid crystal display panel 1, the multi-application nozzle 13 is used to apply the liquid organic medium 15 to a surface of the protective plate 2 in a grid pattern, and then the display panel 1 and the protective plate 2 are laid on top of each other. The same result is obtained also by applying the liquid organic medium 15 solidly to a surface of the protective plate 2 instead of the liquid crystal display panel 1, applying the liquid organic medium 15 in a grid pattern to a surface of the display panel 1 instead of the protective plate 2, and then placing the display panel 1 and the protective plate 2 on top of each other.

Fourth Embodiment

Figure 8:
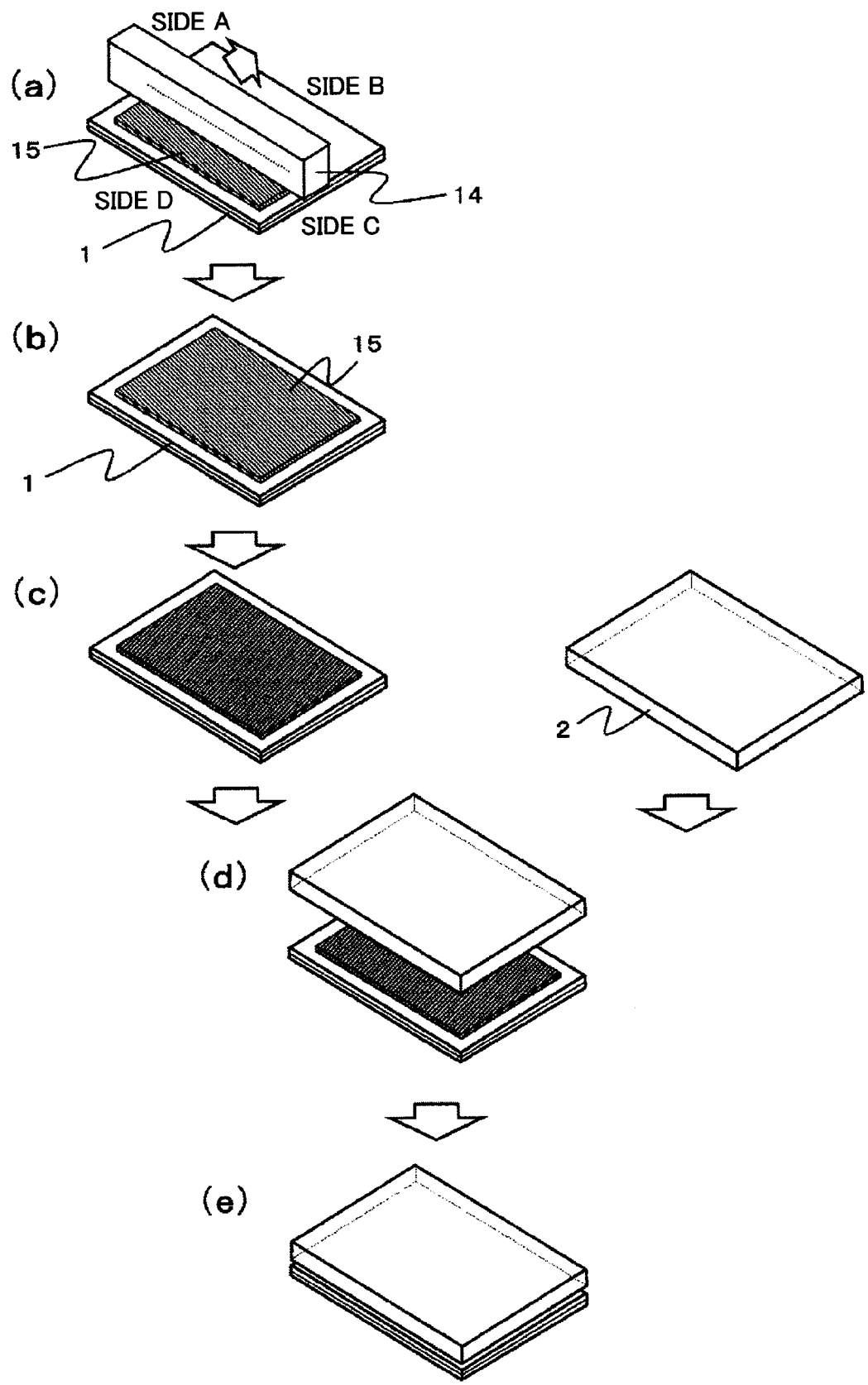
FIGS. 8A to 8E are perspective views illustrating a fourth embodiment of the present invention.
Figure 9:
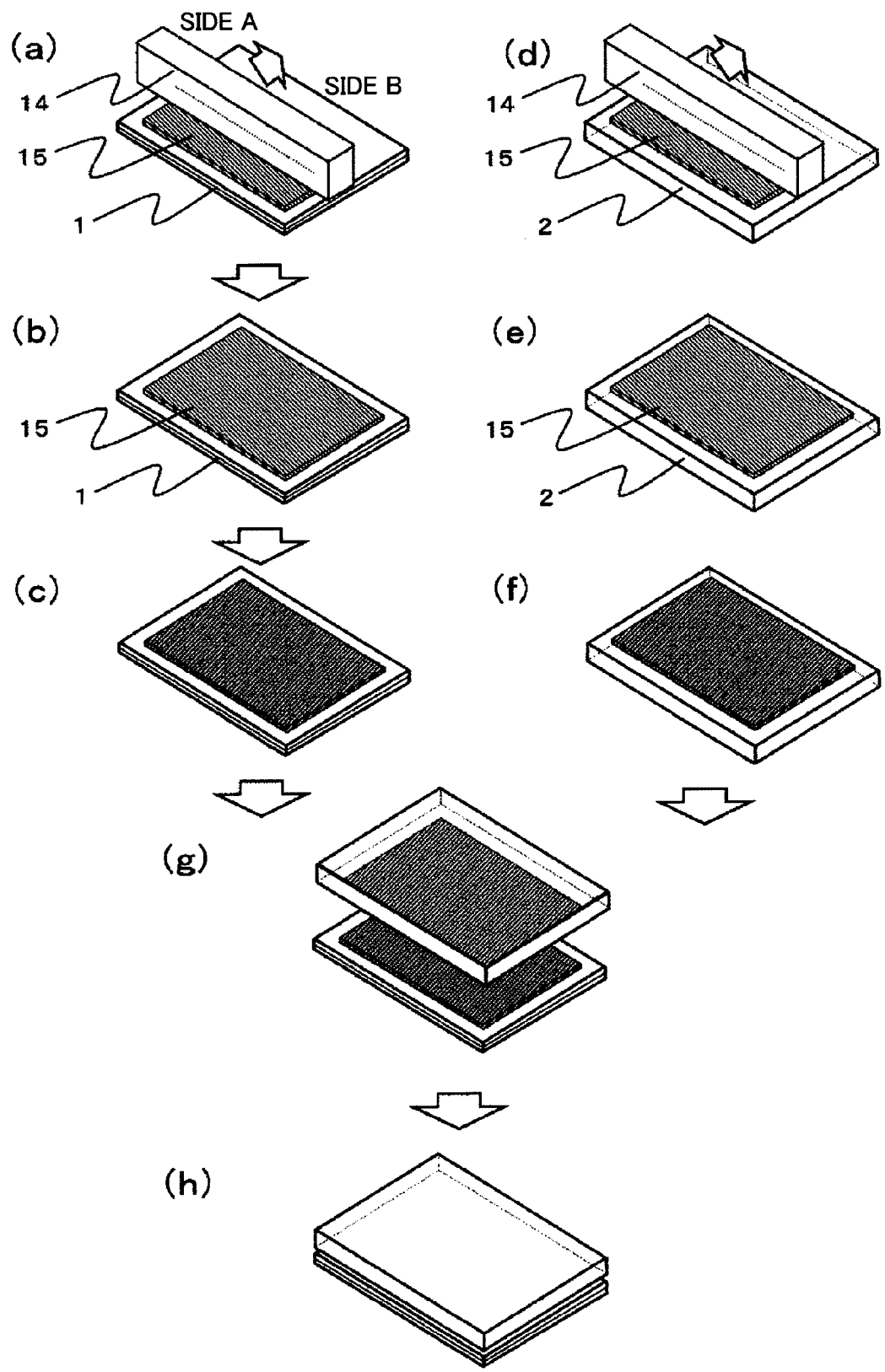
FIGS. 9A to 9H are perspective views illustrating the fourth embodiment of the present invention.

A fourth embodiment of the present invention is described with reference to FIGS. 8 and 9. First, the slit application nozzle 14 is used to apply the liquid organic medium 15 solidly to a surface of the liquid crystal display panel 1 from Side D to Side B (or from Side B to Side D, from Side A to Side C, from Side C to Side A; any way, the direction does not matter) (FIGS. 8A and 8B).

Next, a process for curing the solidly applied liquid organic medium 15 is performed (FIG. 8C). How the liquid organic medium is cured varies depending on the composition of the liquid organic medium employed. For example, the liquid organic medium may be cured by irradiation of ultraviolet rays or by heating, or may receive irradiation of ultraviolet rays first to be cured, followed by heating to be cured further.

Next, the protective plate 2 is positioned above the liquid crystal display panel 1, where the liquid organic medium 15 has been cured, and then laid on top of the liquid crystal display panel 1 in a reduced pressure atmosphere (e.g., vacuum chamber) (FIG. 8D). Thereafter, the interior of the vacuum chamber is returned to the atmospheric pressure and a process for curing the liquid organic medium is performed if necessary.

In the embodiment of FIGS. 8A to 8E, the liquid organic medium 15 is applied solidly to a surface of the liquid crystal display panel 1 with the use of the slit application nozzle 14 and is cured, and then the protective plate 2 is laid on top of the liquid crystal display panel 1. The same result is obtained by applying the liquid organic medium 15 solidly to a surface of the protective plate 2, instead of the liquid crystal display panel 1, curing the liquid organic medium 15, and then placing the liquid crystal display panel 1 on top of the protective plate 2. Also, the same result is obtained by a method illustrated in FIGS. 9A to 9H, where the liquid organic medium 15 is applied solidly to surfaces of the liquid crystal display panel 1 and the protective plate 2 both with the use of the slit application nozzle 14 and is cured, and then the two are laid on top of each other.

Fifth Embodiment

A fifth embodiment of the present invention is described with reference to FIGS. 10A to 10F. First, a transparent sheet-like organic medium 16, which is shaped in advance into a sheet shape of a desired thickness, is bonded to a surface of the liquid crystal display panel 1 (FIG. 10A).

Figure 10:
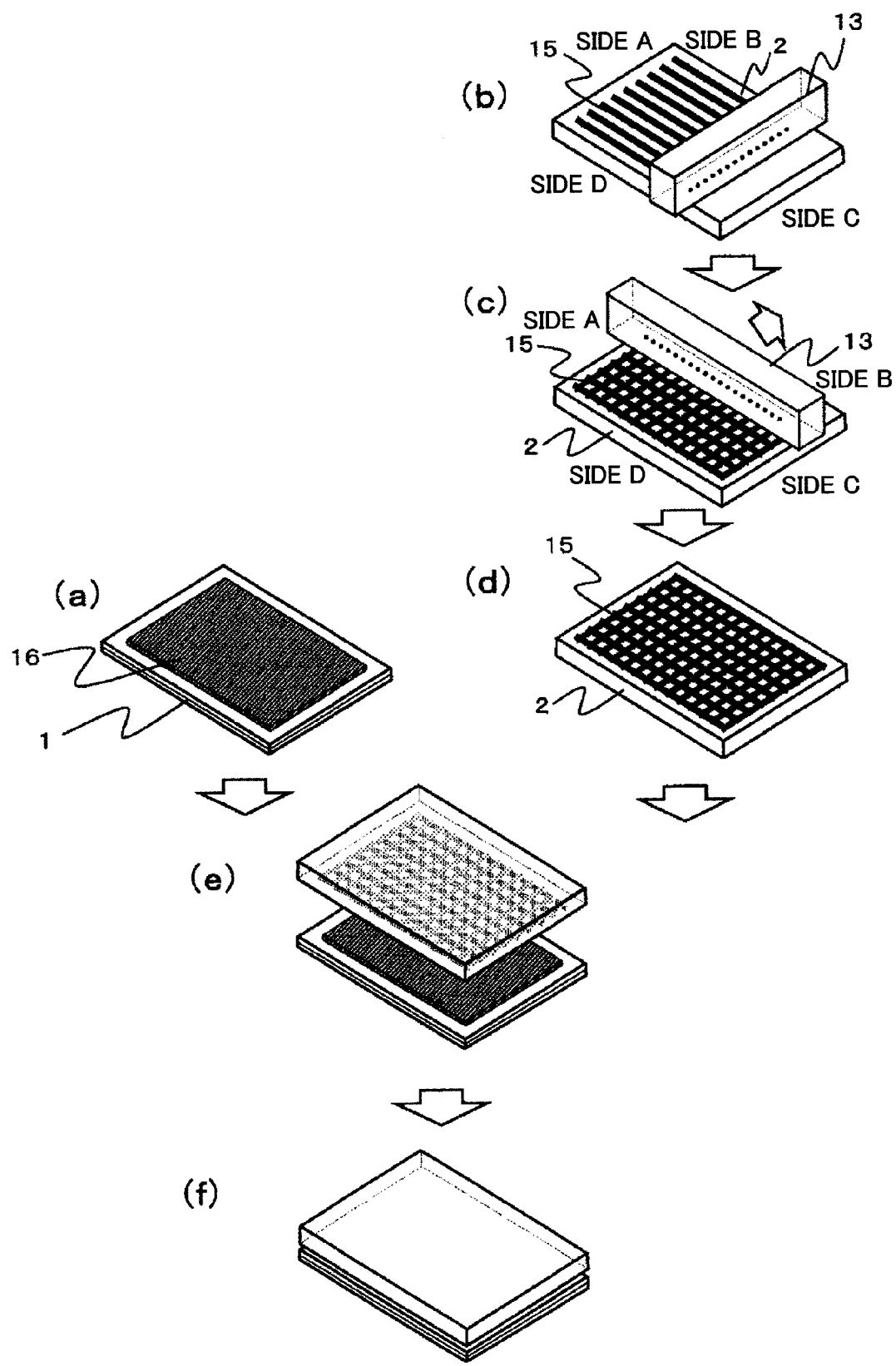
FIGS. 10A to 10F are perspective views illustrating a fifth embodiment of the present invention.

The multi-application nozzle 13 is used to apply the liquid organic medium 15 to a surface of the other substrate, namely, the protective plate 2 from Side A to Side C (or from Side C to Side A; either way, the direction does not matter) in a stripe pattern (FIG. 10B). Next, the liquid organic medium 15 is applied to the same surface of the protective plate 2 from Side D to Side B (or from Side B to Side D; either way, the direction does not matter) in a stripe pattern that intersects the previously formed stripe application pattern (FIG. 10C). A grid pattern illustrated in FIG. 10D is thus formed.

The protective plate 2 to which the liquid organic medium 15 has been applied in a grid pattern is positioned above the liquid crystal display panel 1 to which the transparent sheet-like organic medium 16 shaped in advance into a sheet shape of a desired thickness, and then laid on top of the liquid crystal display panel 1 in a reduced pressure atmosphere (e.g., vacuum chamber) (FIG. 10E). Thereafter, the interior of the vacuum chamber is returned to the atmospheric pressure and a process for curing the liquid organic medium is performed if necessary (FIG. 10F).

In the embodiment of FIGS. 10A to 10F, the transparent sheet-like organic medium 16 shaped into a sheet shape is bonded to a surface of the liquid crystal display panel 1, the liquid organic medium 15 is applied in a grid pattern to a surface of the other substrate, namely the protective plate 2, with the use of the multi-application nozzle 13, and then the display panel 1 and the protective plate 2 are laid on top of each other. The same result is obtained also by bonding the transparent sheet-like organic medium 16, which is shaped in advance into a sheet shape of a desired thickness, to a surface of the protective plate 2 instead of the liquid crystal display panel 1, applying the liquid organic medium 15 in a grid pattern to a surface of the display panel 1 instead of the protective plate 2, and then placing the display panel 1 and the protective plate 2 on top of each other.

Sixth Embodiment

A sixth embodiment of the present invention is described with reference to FIGS. 11A to 11H. First, the slit application nozzle 14 is used to apply the liquid organic medium 15 solidly to a surface of the liquid crystal display panel 1 from Side D to Side B (or from Side B to Side D, from Side A to Side C, from Side C to Side A; any way, the direction does not matter) (FIGS. 11A and 11B).

Figure 11:
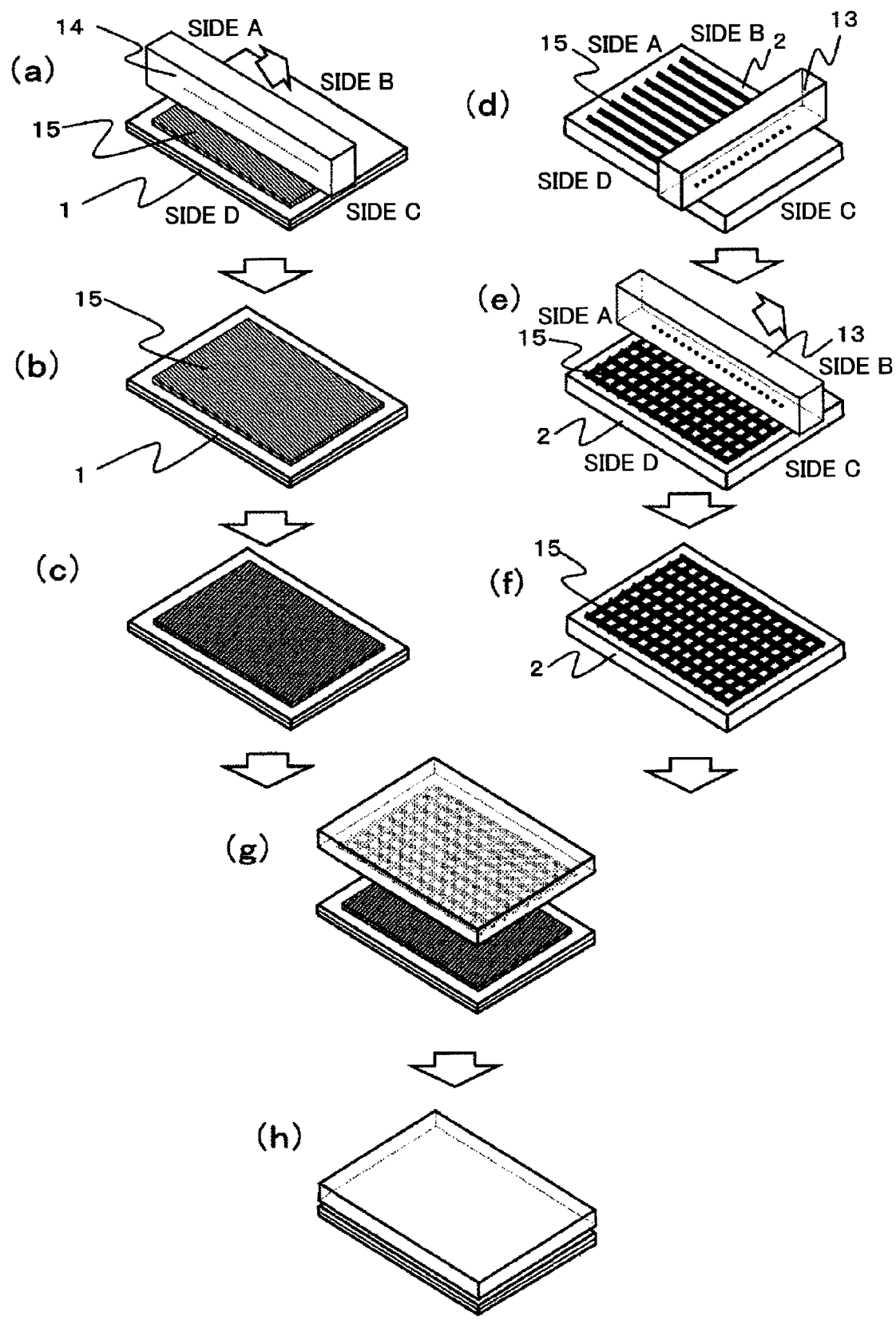
FIGS. 11A to 11H are perspective views illustrating a sixth embodiment of the present invention.

Next, a process for curing the solidly applied liquid organic medium 15 is performed (FIG. 11C). How the liquid organic medium is cured varies depending on the composition of the liquid organic medium employed. For example, the liquid organic medium may be cured by irradiation of ultraviolet rays or by heating, or may receive irradiation of ultraviolet rays first to be cured, followed by heating to be cured further.

The multi-application nozzle 13 is used to apply the liquid organic medium 15 to a surface of the other substrate, namely, the protective plate 2 from Side A to Side C (or from Side C to Side A; either way, the direction does not matter) in a stripe pattern (FIG. 11D). Next, the liquid organic medium 15 is applied to the same surface of the protective plate 2 from Side D to Side B (or from Side B to Side D; either way, the direction does not matter) in a stripe pattern that intersects the previously formed stripe application pattern (FIG. 11E). A grid pattern illustrated in FIG. 11F is thus formed.

The protective plate 2 to which the liquid organic medium 15 has been applied in a grid pattern is positioned above the liquid crystal display panel 1 on which the liquid organic medium 15 has been cured, and then laid on top of the liquid crystal display panel 1 in a reduced pressure atmosphere (e.g., vacuum chamber) (FIG. 11G). Thereafter, the interior of the vacuum chamber is returned to the atmospheric pressure and a process for curing the liquid organic medium is performed if necessary (FIG. 11H).

In the embodiment of FIGS. 11A to 11H, the liquid organic medium 15 is applied solidly to a surface of the liquid crystal display panel 1 with the use of the slit application nozzle 14 and is cured, the multi-application nozzle 13 is used to apply the liquid organic medium 15 to a surface of the other substrate, namely, the protective plate 2 in a grid pattern, and then the display panel 1 and the protective plate 2 are laid on top of each other. The same result is obtained also by applying the liquid organic medium 15 solidly with the use of the slit application nozzle 14 to a surface of the protective plate 2 instead of the liquid crystal display panel 1, curing the liquid organic medium 15, applying the liquid organic medium 15 in a grid pattern to a surface of the display panel 1 instead of the protective plate 2, and then placing the display panel 1 and the protective plate 2 on top of each other.

Seventh Embodiment

Figure 12:
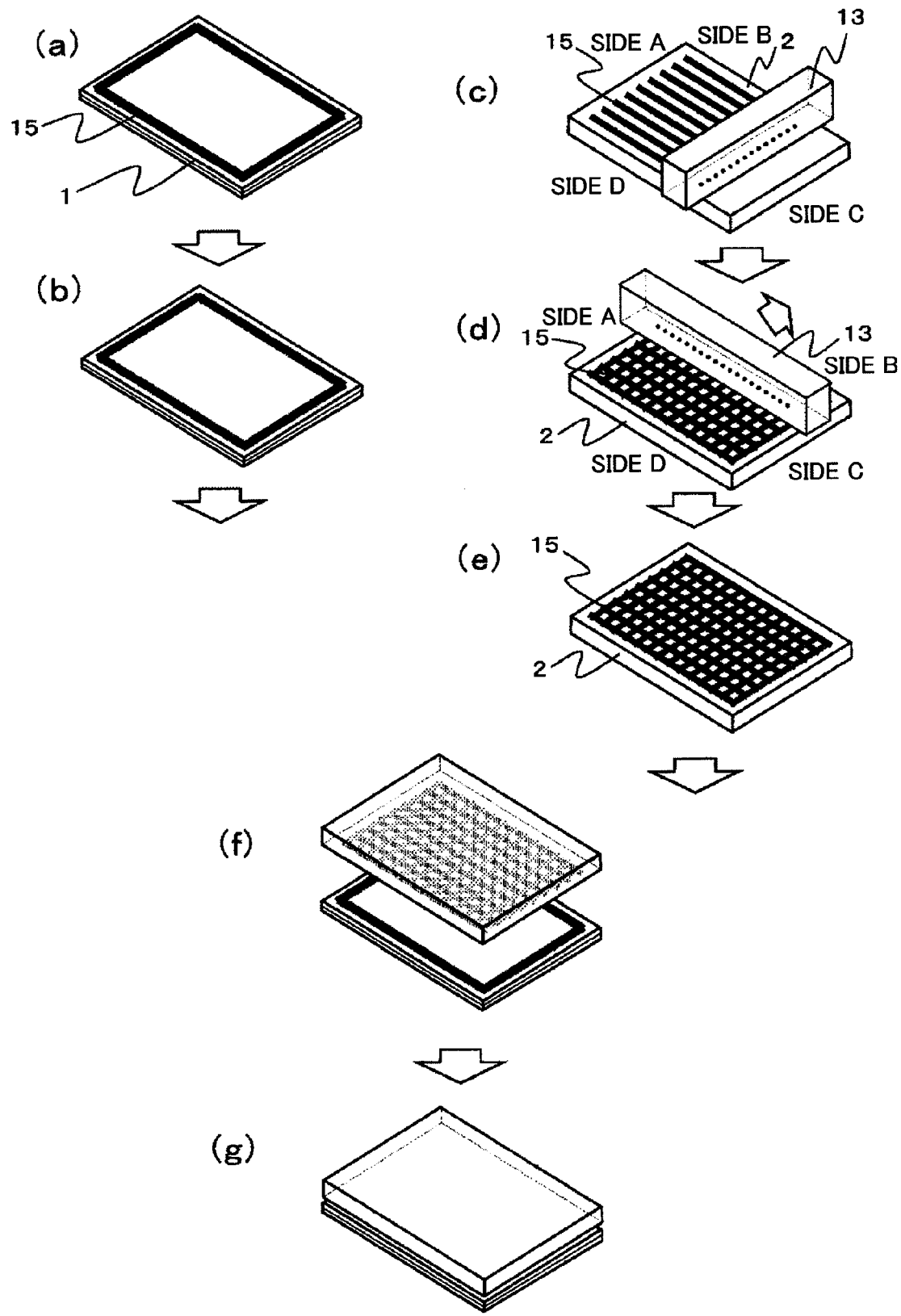
FIGS. 12A to 12G are perspective views illustrating a seventh embodiment of the present invention.

A seventh embodiment of the present invention is described with reference to FIGS. 12A to 12G. First, a dispenser or the like is used to apply the liquid organic medium 15 to a surface of the liquid crystal display panel 1 in a frame pattern in an area outside the effective display portion of the display panel 1 so that the effective display portion is surrounded by the liquid organic medium 15 (FIG. 12A). The applied organic medium is then cured (FIG. 12B). The multi-application nozzle 13 is used to apply the liquid organic medium 15 to a surface of the other substrate, namely, the protective plate 2, from Side A to Side C (or from Side C to Side A; either way, the direction does not matter) in a stripe pattern (FIG. 12C). Next, the liquid organic medium 15 is applied to the same surface of the protective plate 2 from Side D to Side B (or from Side B to Side D; either way, the direction does not matter) in a stripe pattern that intersects the previously formed stripe application pattern (FIG. 12D). A grid pattern illustrated in FIG. 12E is thus formed.

The protective plate 2 to which the liquid organic medium 15 has been applied in a grid pattern is positioned above the liquid crystal display panel 1 to which the liquid organic medium 15 has been applied in a frame pattern and cured, and then laid on top of the liquid crystal display panel 1 in a reduced pressure atmosphere (e.g., vacuum chamber) (FIG. 12F). Thereafter, the interior of the vacuum chamber is returned to the atmospheric pressure and a process for curing the liquid organic medium is performed if necessary (FIG. 12G).

In the embodiment of FIGS. 12A to 12G, a dispenser or the like is used to apply the liquid organic medium 15 to a surface of the liquid crystal display panel 1 in a frame pattern in an area outside the effective display portion of the display panel 1 so that the effective display portion is surrounded by the liquid organic medium 15, the applied organic medium is then cured, the multi-application nozzle 13 is used to apply the liquid organic medium 15 to a surface of the other substrate, namely, the protective plate 2 in a grid pattern, and then the display panel 1 and the protective plate 2 are laid on top of each other. The same result is obtained also by applying the liquid organic medium 15 to a surface of the protective plate 2, instead of the liquid crystal display panel 1, in a frame pattern in an area corresponding to the peripheral area of the effective display portion of the display panel 1 so that the effective display portion is surrounded by the liquid organic medium 15 after the display panel 1 and the protective plate 2 are bonded together, curing the frame-patterned liquid organic medium 15, applying the liquid organic medium 15 in a grid pattern to a surface of the display panel 1 instead of the protective plate 2, and then placing the display panel 1 and the protective plate 2 on top of each other.

Eighth Embodiment

Figure 13:
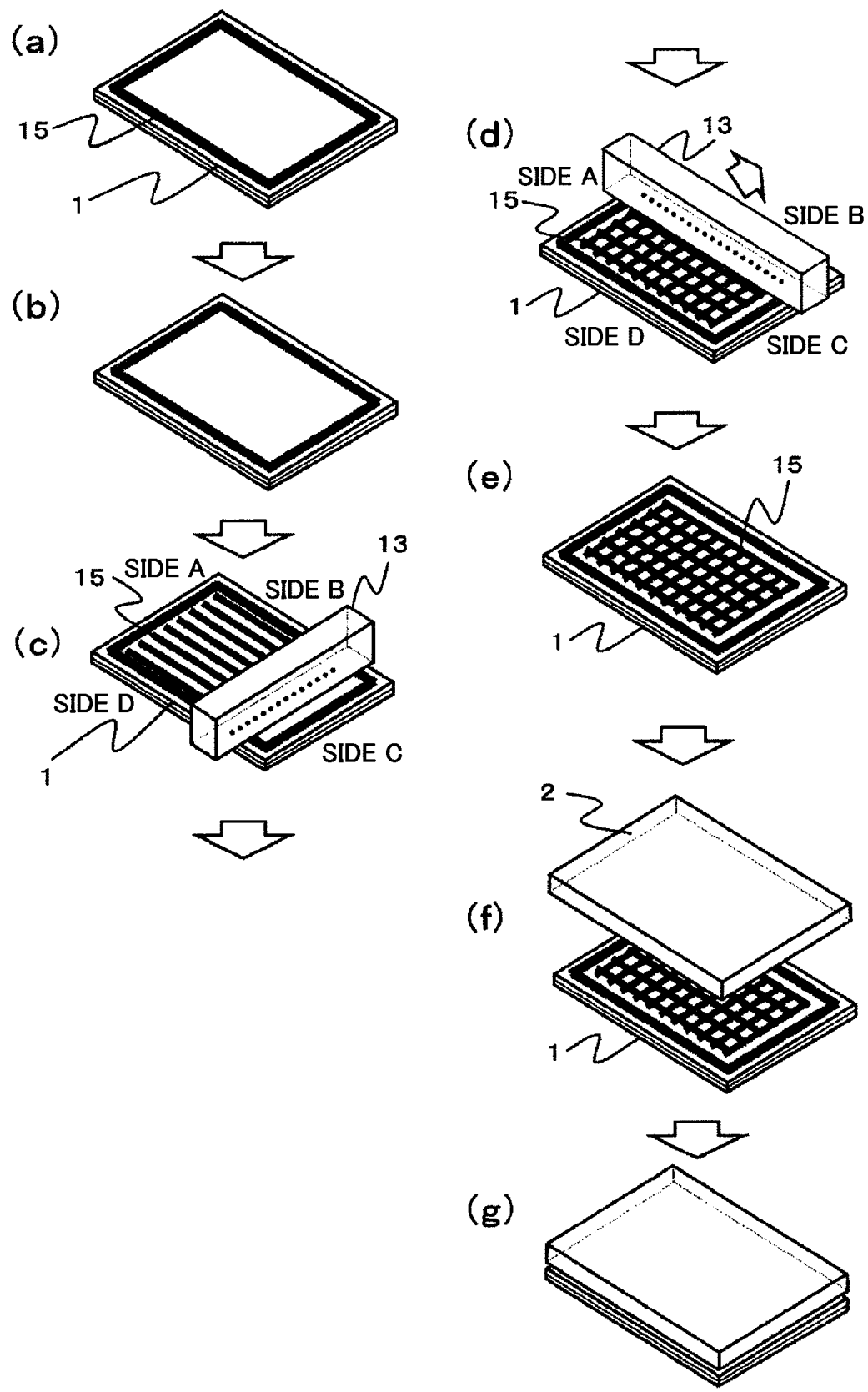
FIGS. 13A to 13G are perspective views illustrating an eighth embodiment of the present invention.

An eighth embodiment of the present invention is described with reference to FIGS. 13A to 13G. First, a dispenser or the like is used to apply the liquid organic medium 15 to a surface of the liquid crystal display panel 1 in a frame pattern in an area outside the effective display portion of the display panel 1 so that the effective display portion is surrounded by the liquid organic medium 15 (FIG. 13A). The applied organic medium is then cured (FIG. 13B). The multi-application nozzle 13 is used to apply the liquid organic medium 15 to the same surface of the display panel 1 from Side A to Side C (or from Side C to Side A; either way, the direction does not matter) in a stripe pattern (FIG. 13C). Next, the liquid organic medium 15 is applied to the same surface of the display panel 1 from Side D to Side B (or from Side B to Side D; either way, the direction does not matter) in a stripe pattern that intersects the previously formed stripe application pattern (FIG. 13D). A frame pattern formed so as to surround the effective display portion and a grid pattern formed inside the frame pattern which are illustrated in FIG. 13E are thus formed.

The protective plate 2 is positioned above the liquid crystal display panel 1, and then laid on top of the liquid crystal display panel 1 in a reduced pressure atmosphere (e.g., vacuum chamber) (FIG. 13F). Thereafter, the interior of the vacuum chamber is returned to the atmospheric pressure and a process of curing the liquid organic medium is performed if necessary (FIG. 13G).

In the embodiment of FIGS. 13A to 13G, a dispenser or the like is used to apply the liquid organic medium 15 to a surface of the liquid crystal display panel 1 in a frame pattern in an area outside the effective display portion of the display panel 1 so that the effective display portion is surrounded by the liquid organic medium 15, the applied organic medium is then cured, the multi-application nozzle 13 is used to apply the liquid organic medium 15 to a surface of the display panel 1 in a grid pattern, and then the display panel 1 and the protective plate 2 are laid on top of each other. The same result is obtained also by applying the liquid organic medium 15 to a surface of the protective plate 2, instead of the liquid crystal display panel 1, in a frame pattern in an area corresponding to the peripheral area of the effective display portion of the display panel 1 so that the effective display portion is surrounded by the liquid organic medium 15 after the display panel 1 and the protective plate 2 are bonded together, curing the frame-patterned liquid organic medium 15, applying the liquid organic medium 15 in a grid pattern to the same surface of the protective plate 2, and then placing the display panel 1 and the protective plate 2 on top of each other.

Ninth Embodiment

A ninth embodiment of the present invention is described with reference to FIGS. 14A to 14F. First, the transparent sheet-like organic medium 16, which is shaped in advance into a sheet shape of a desired thickness, is cut into strips of about 2 mm to 6 mm in width, or the sheet-like organic medium 16 that is shaped to have a width of about 2 mm to 6 mm is prepared. The strips of the sheet-like organic medium 16 are arranged in a frame pattern and bonded to an area outside the effective display portion of the liquid crystal display panel 1 so that the effective display portion is surrounded by the strips of the sheet-like organic medium 16 (FIG. 14A).

Figure 14:
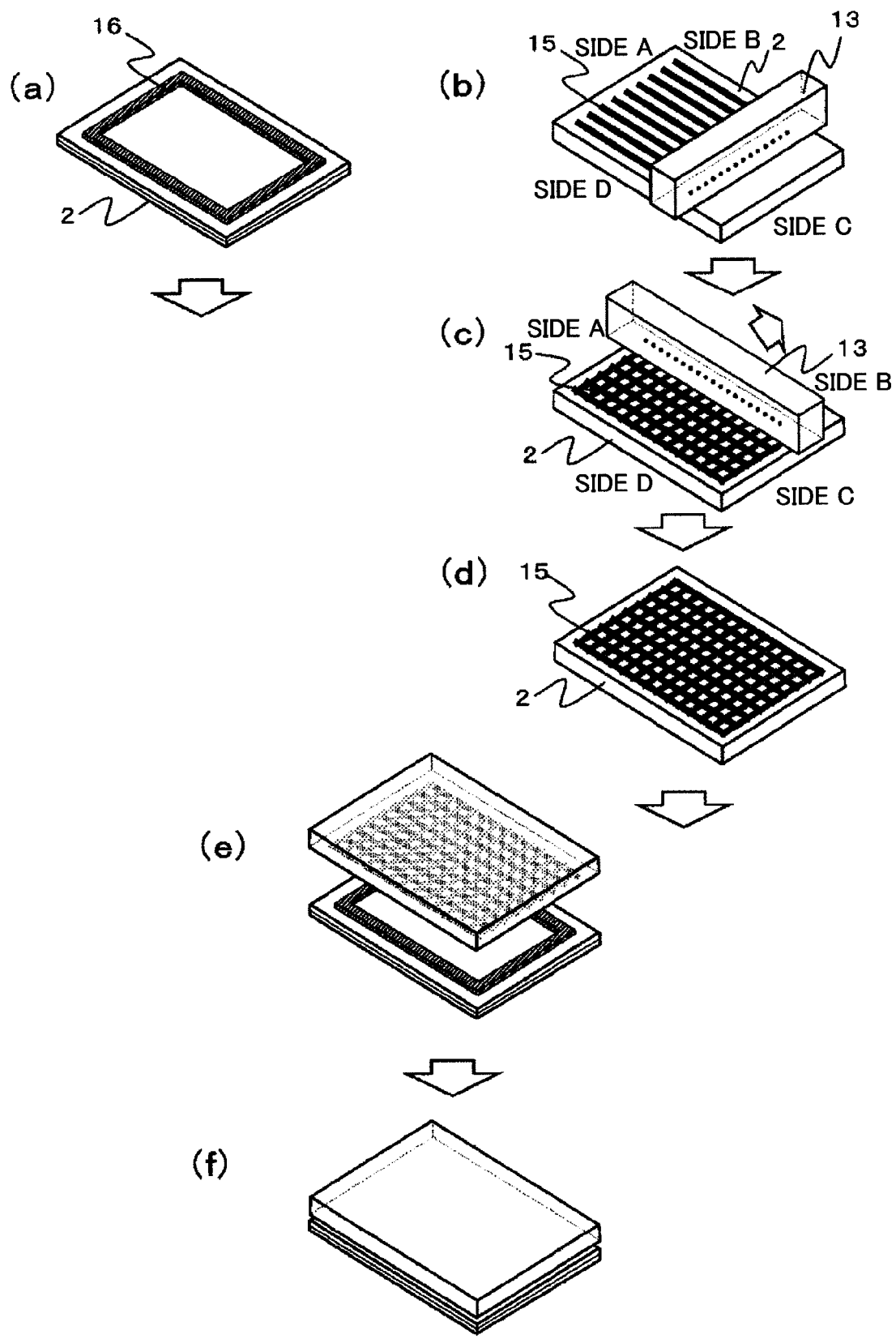
FIGS. 14A to 14F are perspective views illustrating a ninth embodiment of the present invention.

On the other hand, the multi-application nozzle 13 is used to apply the liquid organic medium 15 to a surface of the protective plate 2 from Side A to Side C (or from Side C to Side A; either way, the direction does not matter) in a stripe pattern (FIG. 14B). Next, the liquid organic medium 15 is applied to the same surface of the protective plate 2 from Side D to Side B (or from Side B to Side D; either way, the direction does not matter) in a stripe pattern that intersects the previously formed stripe application pattern (FIG. 14C). A grid pattern illustrated in FIG. 14D is thus formed.

The protective plate 2 is positioned above the liquid crystal display panel 1, and then laid on top of the liquid crystal display panel 1 in a reduced pressure atmosphere (e.g., vacuum chamber) (FIG. 14E). Thereafter, the interior of the vacuum chamber is returned to the atmospheric pressure and a process of curing the liquid organic medium is performed if necessary (FIG. 14F).

In the embodiment of FIGS. 14A to 14F, the sheet-like organic medium 16 is cut into strips of about 2 mm to 6 mm in width, or the sheet-like organic medium 16 is shaped into a sheet shape having a width of about 2 mm to 6 mm. The 2 mm to 6 mm-wide strips of the sheet-like organic medium 16 are arranged into a frame pattern and bonded to a surface of the liquid crystal display panel 1 in an area outside the effective display portion of the display panel 1 so that the effective display portion is surrounded by the strips of the sheet-like organic medium 16. The multi-application nozzle 13 is used to apply the liquid organic medium 15 in a grid pattern to a surface of the other substrate, namely, the protective plate 2. The display panel 1 and the protective plate 2 are then laid on top of each other. The same result is obtained also by cutting the sheet-like organic medium 16 into strips of about 2 mm to 6 mm in width or shaping the sheet-like organic medium 16 to have a width of about 2 mm to 6 mm, arranging the strips of the sheet-like organic medium 16 into a frame pattern and bonding the strips of the sheet-like organic medium 16 to a surface of the protective plate 2, instead of the liquid crystal display panel 1, in an area corresponding to the peripheral area of the effective display portion of the display panel 1 so that the effective display portion is surrounded by the strips of the sheet-like organic medium 16 after the display panel 1 and the protective plate 2 are bonded together, applying the liquid organic medium 15 in a grid pattern to a surface of the display panel 1, instead of the protective plate 2, and then placing the display panel 1 and the protective plate 2 on top of each other.

Also, the same result is obtained when the sheet-like organic medium 16 is cut into strips of about 2 mm to 6 mm in width or shaped to have a width of about 2 mm to 6 mm, the strips of the sheet-like organic medium 16 are arranged into a frame pattern and bonded to only one of the substrates, the liquid organic medium 15 is applied in a grid pattern to this substrate with the use of the multi-application nozzle 13, and then this substrate is positioned with respect to the other substrate to be laid on top of the other substrate.

The present invention is applicable as a method of manufacturing a liquid crystal display.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A method of manufacturing a display having a display panel, a transparent protective plate, which is placed in front of the display panel, and a layer formed of a transparent organic medium, which is placed between the display panel and the protective plate, the method comprising the steps of:
    applying the organic medium in a liquid state in a frame pattern to a surface of at least one of the display panel and the protective plate in an area that is outside an effective display portion of the display panel;
    applying the organic medium in the liquid state in at least one of a stripe pattern and a grid pattern to the surface of the at least one of the display panel and the protective plate within the area delimited by the frame pattern;
    after the step of applying the organic medium in the liquid state in the frame pattern and the at least one of the stripe pattern and the grid pattern, arranging the display panel and the protective plate to oppose each other with the organic medium interposed therebetween and subjecting the arranged display panel and protective plate together to a reduced pressure atmosphere; and
    curing the organic medium;
    wherein the organic medium in the frame pattern is cured before the arranging of the display panel and the protective plate to oppose each other; and
    wherein the organic medium in the at least one of the stripe pattern and the grid pattern is cured after the arranging of the display panel and the protective plate to oppose each other.

2. The method of manufacturing a display according to claim 1,
    wherein one of the display panel and the protective plate that is an application target plate to which the organic medium is applied in a grid pattern is a quadrangle, and
    wherein grid cells in the grid pattern of the organic medium applied to one of the display panel and the protective plate are at an angle with respect to the quadrangular application target plate.

3. The method of manufacturing a display according to claim 1, wherein the organic medium is applied to the at least one of the display panel and the protective plate as one of a grid pattern formed by three or more different stripe patterns that intersect one another, and an equivalence to a shape of the grid pattern formed by three or more different stripe patterns that intersect one another.

4. The method of manufacturing a display according to claim 1, wherein the step of arranging the display panel and the protective plate with the organic medium interposed therebetween and subjecting the arranged display panel and protective plate together in the reduced pressure atmosphere is carried out in a vacuum chamber.

5. A method of manufacturing a display having a display panel, a transparent protective plate, which is placed in front of the display panel, and a layer formed of a transparent organic medium, which is placed between the display panel and the protective plate, the method comprising the steps of:
    applying the organic medium in a liquid state to a surface of at least one of the display panel and the protective plate;
    after the step of applying the organic medium in the liquid state, arranging the display panel and the protective plate to oppose each other with the organic medium interposed therebetween and subjecting the arranged display panel and protective plate together to a reduced pressure atmosphere;
    curing the organic medium;
    wherein the step of applying the organic medium in the liquid state to the surface of the at least one of the display panel and the protective plate, includes applying the organic medium in the liquid state in a frame pattern to the at least one of the protective plate and the display panel in an area that is outside an effective display portion of the display panel, and applying the organic medium in the liquid state in at least one of a stripe pattern and a grid pattern to the surface of the at least one of the protective plate and the display panel within the area delimited by the frame pattern; and
    wherein the organic medium in the liquid state is applied in the frame pattern prior to applying the organic medium in the at least one of the stripe pattern and the grid pattern in the liquid state to the surface of the at least one of the protective plate and the display panel, and wherein the organic medium applied in the frame pattern is cured prior to applying the organic medium in the at least one of the stripe pattern and the grid pattern.

6. The method of manufacturing a display according to claim 1, wherein the organic medium in the frame pattern is cured before applying the organic medium in the liquid state in the at least one of the stripe pattern and the grid pattern.

* * * * *